United States Patent
Hagiwara et al.

(10) Patent No.: US 8,722,232 B2
(45) Date of Patent: May 13, 2014

(54) ELECTROCHEMICAL DEVICE

(71) Applicant: Taiyo Yuden Co., Ltd., Tokyo (JP)

(72) Inventors: Naoto Hagiwara, Gunma (JP); Kyotaro Mano, Gunma (JP); Katsuei Ishida, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 13/970,959

(22) Filed: Aug. 20, 2013

(65) Prior Publication Data

US 2014/0057158 A1   Feb. 27, 2014

(30) Foreign Application Priority Data

Aug. 24, 2012 (JP) ................. 2012-184707

(51) Int. Cl.
*H01M 10/02* (2006.01)
(52) U.S. Cl.
USPC ............................................. 429/161
(58) Field of Classification Search
None
See application file for complete search history.

(56) References Cited

U.S. PATENT DOCUMENTS

2004/0157121 A1*  8/2004  Watanabe et al. ............. 429/185
2004/0166409 A1*  8/2004  Takada et al. ............. 429/218.1

FOREIGN PATENT DOCUMENTS

| JP | S60-171716 A | 9/1985 |
| JP | S61-042859 A | 3/1986 |
| JP | S62-115667 A | 5/1987 |
| JP | H03-266358 A | 11/1991 |
| JP | 2000-294454 A | 10/2000 |
| JP | 2003-197475 A | 7/2003 |
| JP | 2006-012792 A | 1/2006 |
| JP | 2006-108140 A | 4/2006 |
| JP | 2009-200161 A | 9/2009 |
| JP | 4773133 B | 9/2011 |
| WO | 2008/059846 A1 | 5/2008 |

* cited by examiner

*Primary Examiner* — Patrick Ryan
*Assistant Examiner* — Wyatt McConnell
(74) *Attorney, Agent, or Firm* — Fitch, Even, Tabin & Flannery, LLP

(57) ABSTRACT

An electrochemical device includes a container, a storage element, and a structure. The container includes a container main body including a first inner surface, and a lid including a second inner surface that is opposed to the first inner surface, the lid being joined to the container main body. The storage element includes a first electrode layer that is bonded to the first inner surface, a second electrode layer that is bonded to the second inner surface, and a separator that is provided between the first electrode layer and the second electrode layer, the storage element being sandwiched between the first inner surface and the second inner surface. The structure is provided to at least one of the first inner surface and the second inner surface, at least partially embedded in an inside of at least one of the first electrode layer and the second electrode layer, and made of a cured conductive adhesive.

14 Claims, 17 Drawing Sheets

ELECTROCHEMICAL DEVICE

CROSS-REFERENCE TO RELATED APPLICATION

This application claims priority under 35 U.S.C. §119 to Japanese Patent Application No. JP 2012-184707 filed on Aug. 24, 2012, the entire content of which is hereby incorporated herein by reference in its entirety.

FIELD

The present disclosure relates to an electrochemical device with a built-in chargeable/dischargeable storage element.

BACKGROUND

In general, an electrochemical devices including a chargeable/dischargeable storage element includes a hermetically sealed container that houses a storage element together with an electrolyte, the storage element including a positive electrode, a negative electrode, and a separator provided therebetween. Further, in order to ensure favorable adhesion and electrical connection between a container inner surface and each electrode, forming a conductive adhesive layer between them has been known.

For example, Japanese Patent No. 4773133 describes that, in an electric double-layer capacitor or a secondary cell formed of a recess-like container made of ceramic that houses a positive electrode, a negative electrode, a separator, and an electrolyte and of a lid that seals the container, the positive electrode is bonded to a bottom portion of the container and the negative electrode is bonded to the lid with a conductive adhesive.

SUMMARY

However, in the configuration described in Japanese Patent No. 4773133, the adhesive layers made of the conductive adhesive are formed on entire surfaces of the positive electrode and the negative electrode. The thickness of the device is increased corresponding to the thickness of each of the adhesive layers. A reduction in thickness of the container is difficult. Meanwhile, as the electrode layer is made thinner, a storage property is lowered. If the adhesive layer is made thinner, it becomes difficult to obtain a desired target.

In view of the above-mentioned circumstances, it is desirable to provide an electrochemical device capable of achieving a reduction in thickness without lowering a storage property.

According to an embodiment of the present disclosure, there is provided an electrochemical device including a container, a storage element, and a structure.

The container includes a container main body including a first inner surface, and a lid including a second inner surface that is opposed to the first inner surface, the lid being joined to the container main body.

The storage element includes a first electrode layer that is bonded to the first inner surface, a second electrode layer that is bonded to the second inner surface, and a separator that is provided between the first electrode layer and the second electrode layer. The storage element is sandwiched between the first inner surface and the second inner surface.

The structure is provided to at least one of the first inner surface and the second inner surface, at least partially embedded in an inside of at least one of the first electrode layer and the second electrode layer, and made of a cured conductive adhesive.

These and other objects, features and advantages of the present disclosure will become more apparent in light of the following detailed description of best mode embodiments thereof, as illustrated in the accompanying drawings.

DETAILED DESCRIPTION OF THE EMBODIMENTS

Figure 1:
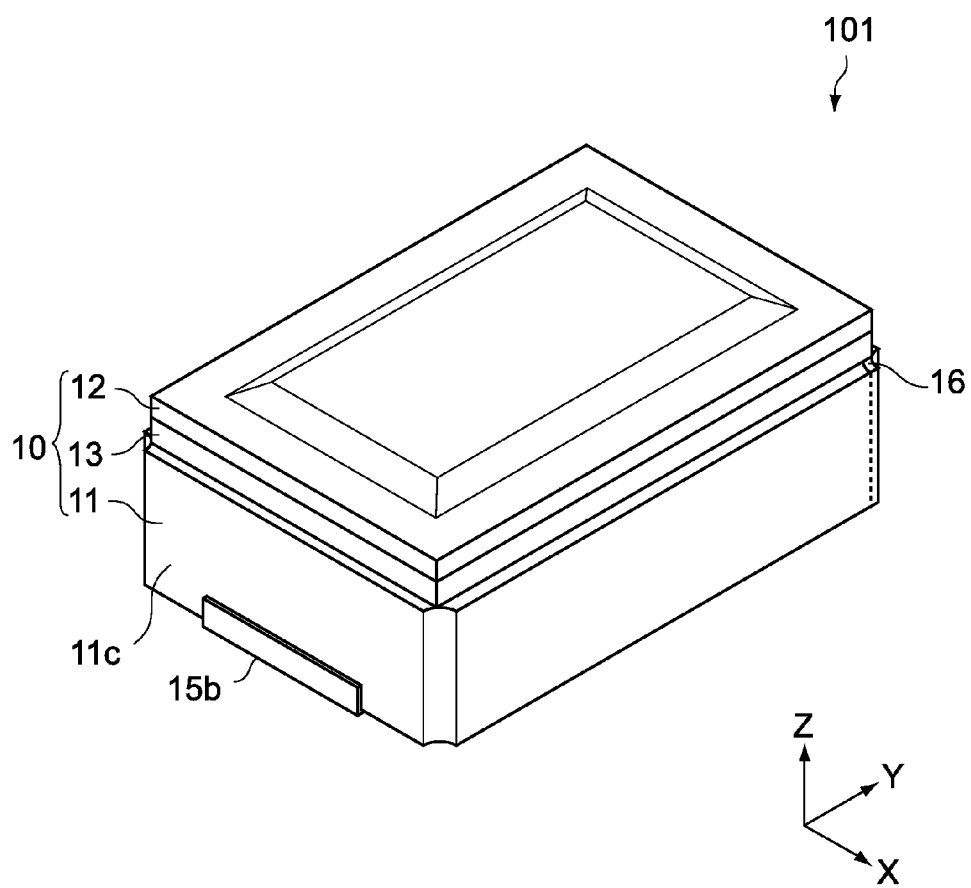
FIG. 1 is a perspective view showing an entire configuration of an electrochemical device according to a first embodiment of the present disclosure.

According to an embodiment of the present disclosure, there is provided an electrochemical device including a container, a storage element, and a structure.

The container includes a container main body including a first inner surface, and a lid including a second inner surface that is opposed to the first inner surface, the lid being joined to the container main body.

The storage element includes a first electrode layer that is bonded to the first inner surface, a second electrode layer that is bonded to the second inner surface, and a separator that is provided between the first electrode layer and the second electrode layer. The storage element is sandwiched between the first inner surface and the second inner surface.

The structure is provided to at least one of the first inner surface and the second inner surface, at least partially embedded in an inside of at least one of the first electrode layer and the second electrode layer, and made of a cured conductive adhesive.

In the electrochemical device, the structure is made of the cured conductive material embedded in the at least one of the first electrode layer and the second electrode layer. Therefore, favorable adhesion and electrical connection between the inner surface and the electrode layer can be ensured. Thus, the electrode layer can be held in close contact with the inner surface of the container without forming an adhesive layer on an entire surface of the electrode layer. Therefore, a reduction in thickness of the device can be achieved without lowering a storage property.

The structure may include a first structure. The first structure is provided in the first inner surface, at least partially embedded in an inside of the first electrode layer, and made of a cured conductive adhesive. Thus, favorable adhesion and electrical connection between the first inner surface and the first electrode layer can be ensured.

The structure may further include a second structure. The second structure is provided in the second inner surface, at least partially embedded in an inside of the second electrode layer, and made of a cured conductive adhesive. Thus, favorable adhesion and electrical connection between the second inner surface and the second electrode layer can be ensured.

The lid may have a flat shape or a three-dimensional shape. For example, the lid includes a flat plate portion including the second inner surface, a peripheral wall portion that surrounds the flat plate portion, and a joining portion that is provided around the peripheral wall portion and joined to the container main body. Thus, the strength of the lid can be increased and the durability of the container can be increased.

The container may further include a first terminal, a second terminal, and a wiring portion.

The first terminal is provided in the first inner surface and electrically connected to the first electrode layer. The second terminal is provided in an outer surface of the container main body. The wiring portion is electrically connected between the first terminal and the second terminal.

Thus, the electrochemical device can be configured as a surface-mounted component.

The first terminal may be embedded in the first inner surface. In this case, the first structure is configured to cover the first terminal. Thus, the first terminal can be protected from an electrolyte.

The container may further include a power collection layer that is provided between the first structure and the first terminal and connected to the first electrode layer. Thus, power collection efficiency can be increased and an improvement in electrical properties of the device can be achieved.

The container may further include an auxiliary layer that is provided between the first inner surface and the first electrode layer and includes a through-hole through which the first structure passes. Using the thickness of the auxiliary layer, the amount of a first end portion embedded in the first electrode layer can be adjusted.

The first structure may include a first protrusion and a plurality of second protrusions.

The first protrusion is provided in a central portion of the first electrode layer and embedded in the first electrode layer. The plurality of second protrusions are provided in a peripheral portion of the first electrode layer and at least partially embedded in the first electrode layer.

Thus, the adhesion of the first electrode layer to the first inner surface can be further increased.

The first structure may further include a connection portion configured to connect the plurality of second protrusions to an inner peripheral surface of the container main body. Thus, it is possible to strongly fix the second protrusions to the container main body.

The first structure and the second structure may be configured to be opposed to each other in a thickness direction of the storage element. Thus, during assembling of the device, first and second end portions can be stably embedded in the first electrode layer and the second electrode layer.

In the above configuration, the first structure and the second structure may be opposed to each other in a central portion of the storage element. Thus, during assembling of the device, due to compression actions of the first electrode layer and the second electrode layer by the first structure and the second structure, it becomes unlikely that the electrolyte will be pushed to an outer peripheral side of the separator. Thus, it is possible to achieve an improvement in assembling workability.

Meanwhile, the second structure may be provided in the second inner surface. In this case, the structure is at least partially embedded in an inside of the second electrode layer. Thus, favorable adhesion and electrical connection between the second inner surface and the second electrode layer can be ensured.

In this case, the structure may include a first protrusion and a plurality of second protrusions.

The first protrusion is provided in a central portion of the second electrode layer and embedded in the second electrode layer. The plurality of second protrusions are provided in the peripheral portion of the second electrode layer and at least partially embedded in the second electrode layer.

Thus, adhesion of the second electrode layer to the second inner surface can be further increased.

The first and/or second structure may have a sharp-pointed shape. Thus, the structures easily stick in the first and/or second electrode layers. Therefore, it becomes easy to embed end portions in those electrode layers. The assembling workability can be improved.

The first and/or second structure may form, in an area of the separator that is sandwiched between the first electrode layer and the second electrode layer, a thin wall portion having a smaller thickness than a thickness of a peripheral portion around the area.

The thin wall portion of the separator has a high density than that of other areas. Therefore, the electrolyte is collected into the thin wall portion due to capillary action and the amount of liquid retained in the thin wall portion increases. Therefore, for example, even when the amount of electrolyte in the container is reduced due to decomposition of the electrolyte due to a long-term use, the electrolyte can be collected into the thin wall portion of the separator. A stable operation of the device over a long-term can be ensured.

Further, the thin wall portion is formed to have a smaller thickness than that of the peripheral portion around the area of the separator that is sandwiched between the first electrode layer and the second electrode layer. Therefore, the amount of electrolyte pushed to an outside of the area when the lid is joined to the container main body can be reduced. Thus, it is possible to suppress penetration or contamination of the electrolyte into/of the joining portion between the container main body and the lid. Therefore, stable bonding workability can be ensured and production efficiency is increased.

Hereinafter, embodiments of the present disclosure will be described with reference to the drawings.

First Embodiment

[Entire Configuration]

Figure 2:
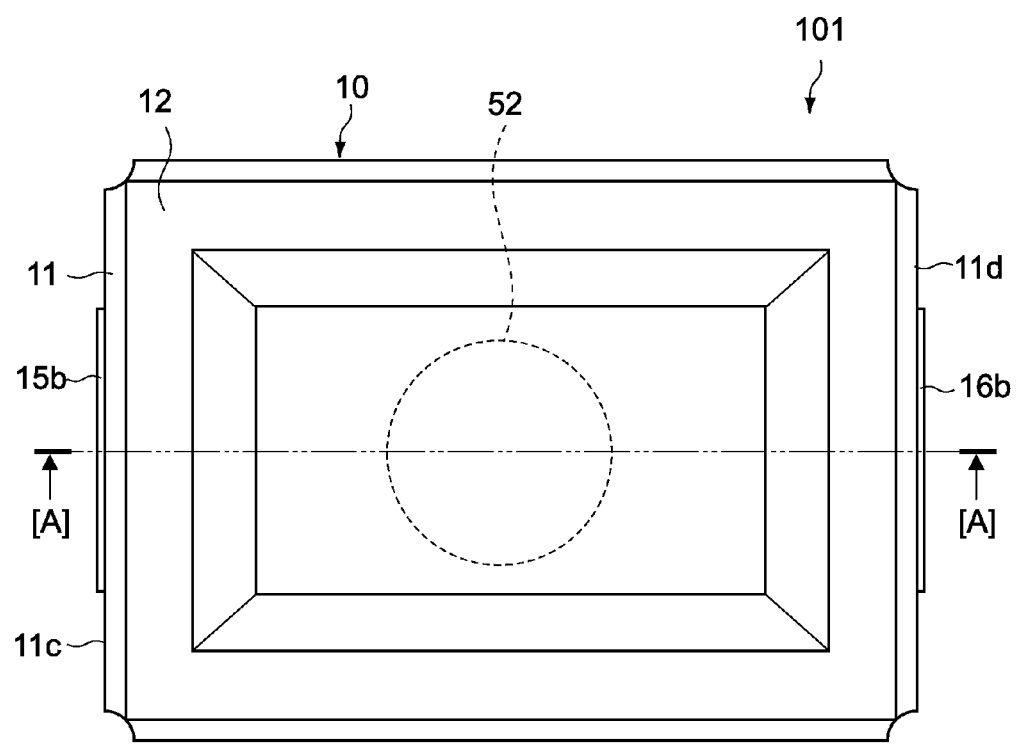
FIG. 2 is a plan view of the electrochemical device.
Figure 2:
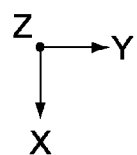
Figure 3:
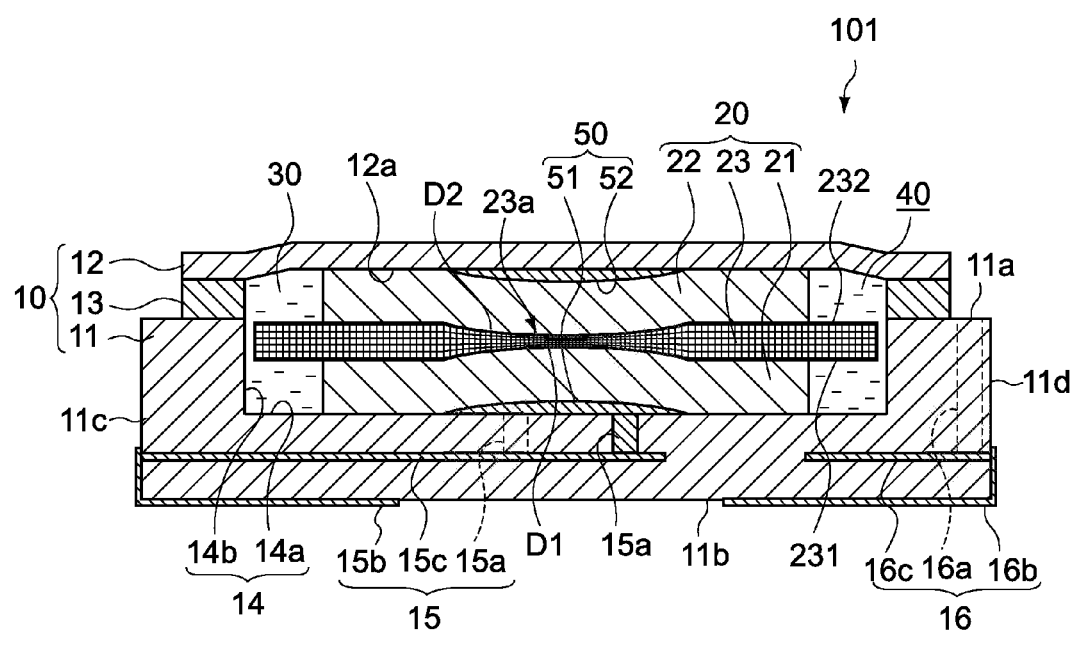
FIG. 3 is a schematic cross-sectional view taken along a direction of the [A]-[A] line of FIG. 2.

FIG. 1 is a perspective view showing an entire configuration of an electrochemical device according to an embodiment of the present disclosure. FIG. 2 is a plan view of the electrochemical device. FIG. 3 is a schematic cross-sectional view taken along a direction of the [A]-[A] line of FIG. 2. In each view, the X-, Y-, and Z-axes indicate three axis directions orthogonal to one another.

An electrochemical device 101 according to this embodiment includes a width direction in an X-axis direction, a length direction in a Y-axis direction, and a height direction in a Z-axis direction. For example, the electrochemical device 101 has a width dimension of 2.5 mm along the X-axis direction, a length dimension of 3.2 mm along the Y-axis direction, and a height dimension of 0.9 mm along the Z-axis direction.

The electrochemical device 101 according to this embodiment includes a container 10 and a storage element 20. The storage element 20 is enclosed in the container 10 together with an electrolyte 30. The electrochemical device 101 is configured as a chargeable/dischargeable electric double-layer capacitor or secondary cell. The electrochemical device 101 is used as, for example, a back-up power supply and the like of an electronic apparatus. The electrochemical device 101 is configured as a surface-mounted component that can be mounted on a circuit substrate of an electronic apparatus (not shown) by a reflow soldering method or the like.

(Container)

The container 10 is formed in a cuboid shape and includes a container main body 11, a lid 12, and a seal ring 13. The container 10 is formed by joining the container main body 11 and the lid 12 to each other with the seal ring 13 being sandwiched therebetween.

Figure 4:
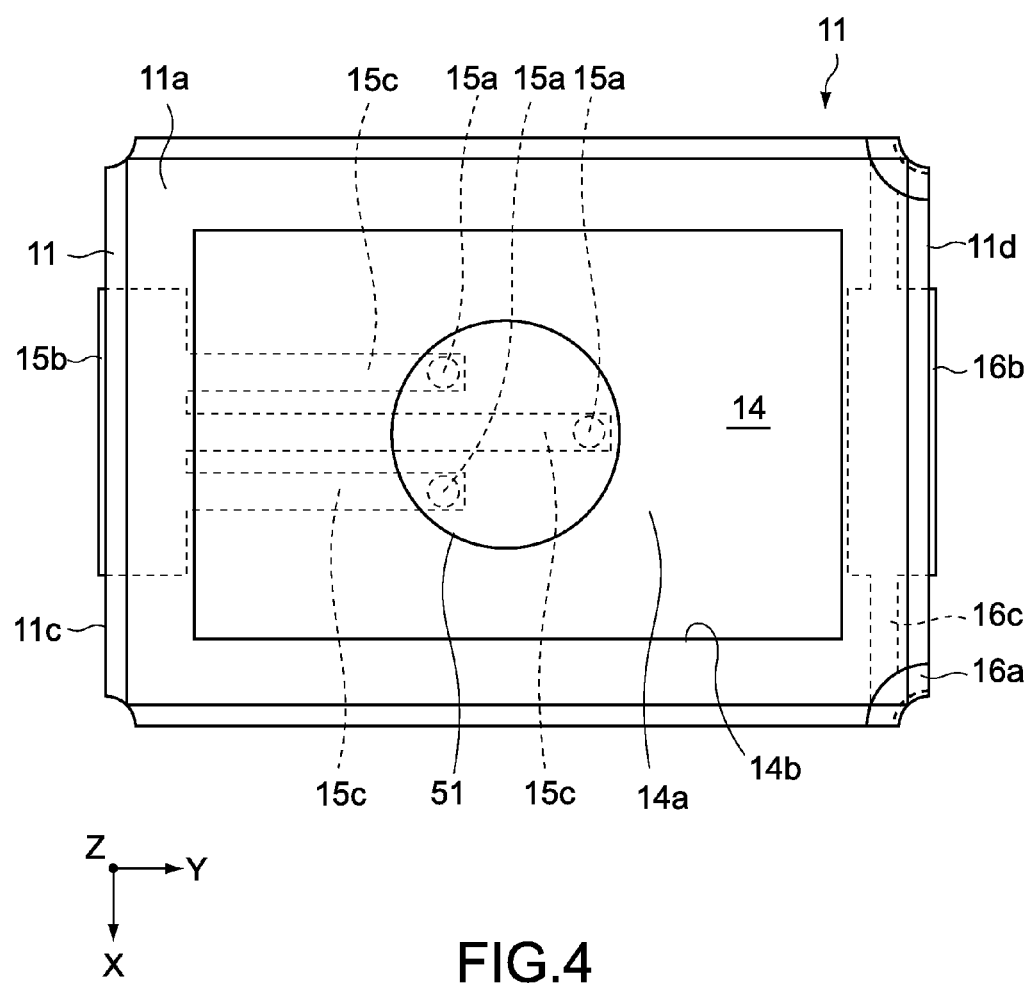
FIG. 4 is a plan view of a container main body of the electrochemical device.

FIG. 4 is a plan view of the container main body 11. The container main body 11 is made of an insulating material such as ceramic and formed in an almost cuboid shape as a whole.

As shown in FIG. 3, the container main body 11 includes an upper surface 11a in which a cuboid recess 14 is formed. The recess 14 includes a flat bottom surface 14a (first inner surface) and four side surfaces 14b. Covered with the lid 12, the recess 14 forms a liquid chamber 40 that houses the storage element 20 and the electrolyte 30.

The lid 12 is made of an almost rectangular plate material that is joined to the upper surface 11a of the container main body 11 to cover the recess 14. The lid 12 is formed of a plate member including a flat inner surface 12a (second inner surface) that is opposed to the liquid chamber 40. For example, the lid 12 has a width dimension of 2.2 mm along the X-axis direction, a length dimension of 2.9 mm along the Y-axis direction, and a thickness dimension of 0.14 mm along the Z-axis direction.

In this embodiment, the lid 12 has such a shape that four peripheral portions are lower than a central portion toward the container main body 11. However, the lid 12 may have such a shape that the central portion is lower than the peripheral portions toward the container main body 11 in contrast. Alternatively, the lid 12 may have such a flat shape that the peripheral portions are flush with the central portion.

The lid 12 is made of a conductive material such as various metals. For example, the lid 12 is made of kovar (Fe (iron)-Ni (nickel)-Co (cobalt) alloy). Alternatively, the lid 12 may be made of a clad material having a matrix of kovar or the like covered with a film made of a metal having high corrosion resistance such as Ni, Pt (platinum), Ag (silver), Au (gold), and Pd (palladium) in order to prevent galvanic corrosion.

The seal ring 13 is formed of a metal ring member. The seal ring 13 is provided between the upper surface 11a of the container main body 11 and the lid 12 to surround the recess 14. The seal ring 13 is made of kovar similar to the lid 12. However, other metal materials may be used for the seal ring 13. The seal ring 13 is made of the same kind of material as that of the lid 12 or a material identical to that of the lid 12. Therefore, it is possible to reduce generation of thermal stress due to differences in coefficient of thermal expansion therebetween.

The lid 12 is joined to the container main body 11 via the seal ring 13 after the storage element 20 is placed in the recess 14 and the electrolyte 30 is injected into the recess 14. In this manner, the hermetically sealed liquid chamber 40 is formed within the container 10. The lid 12 is joined to the container main body 11 by a laser welding method. However, the laser welding method may be replaced by other welding techniques such as a seam welding method or other joining techniques.

The container main body 11 is manufactured by burning a plurality of laminated ceramic sheets. For example, the recess 14 is formed of a single ceramic sheet having an opening or formed by laminating one or more ceramic sheets each having an opening. The container main body 11 includes a positive-electrode wiring 15 and a negative-electrode wiring 16. The positive-electrode wiring 15 is electrically connected to a positive-electrode layer 21 of the storage element 20 housed in the liquid chamber 40. The negative-electrode wiring 16 is electrically connected to a negative-electrode layer 22 of the storage element 20.

The positive-electrode wiring 15 includes via-holes 15a (first terminal) embedded in the bottom surface 14a of the recess 14, an external positive-electrode terminal 15b (second terminal), and interlayer wiring portions 15c. The via-holes 15a are provided in the bottom surface 14a of the recess 14 to be electrically connected to the positive-electrode layer 21 of the storage element 20. The external positive-electrode terminal 15b is provided in an outer surface of the container main body 11. In this embodiment, the external positive-electrode terminal 15b is formed from one side surface 11c to a lower surface 11b of the container main body 11.

The via-holes 15a are formed in the ceramic sheet constituting the bottom surface 14a of the recess 14. The external positive-electrode terminal 15b is formed in peripheral and rear surfaces of the ceramic sheet forming a bottom portion of the container main body 11. The interlayer wiring portions 15c are formed between layers of the plurality of ceramic sheets. The via-holes 15a, the external positive-electrode terminal 15b, and the interlayer wiring portions 15c are made of a conductive material such as various metals. For example, the via-holes 15a, the external positive-electrode terminal 15b, and the interlayer wiring portions 15c are made of tungsten (W) or laminated films having tungsten (W) on which Ni, Au, or the like is formed.

The via-holes 15a are arranged in an almost central portion of the bottom surface 14a of the recess 14. One or more via-holes 15a may be provided. In this embodiment, the via-holes 15a are formed at three positions almost in the center of the bottom surface 14a. The plurality of interlayer wiring portions 15c for each connecting the via-holes 15a to the external positive-electrode terminal 15b are provided. Note that the interlayer wiring portions 15c may be formed of a single wiring portion common to the via-holes 15a.

The negative-electrode wiring 16 includes connection wiring portions 16a, an external negative-electrode terminal 16b, and an interlayer wiring portion 16c. The connection wiring portions 16a are electrically connected to the negative-electrode layer 22 of the storage element 20. The external negative-electrode terminal 16b is provided in the outer surface of the container main body 11. In this embodiment, the external negative-electrode terminal 16b is formed from the other side surface 11d to the lower surface 11b of the container main body 11.

The connection wiring portions 16a are formed inside side walls of the container main body 11 to be electrically connected to the seal ring 13 provided on the upper surface 11a of the container main body 11. That is, the connection wiring portions 16a are electrically connected to the negative-electrode layer 22 via the seal ring 13, the lid 12, and a second structure 52, which will be described later. Instead of the connection wiring portions 16a, via-holes for connecting between the seal ring 13 and the external negative-electrode terminal 16b or the interlayer wiring portion 16c through the inside of the side walls of the container main body 11 may be formed. The connection wiring portions 16a, the external negative-electrode terminal 16b, and the interlayer wiring portion 16c are made of a conductive material such as various metals. For example, the connection wiring portions 16a, the external negative-electrode terminal 16b, and the interlayer wiring portion 16c are made of tungsten (W) or laminated films having tungsten (W) on which Ni, Au, or the like is formed.

(Storage Element)

The storage element 20 includes a positive-electrode layer 21 (first electrode layer), a negative-electrode layer 22 (second electrode layer), and a separator 23.

The positive-electrode layer 21 is formed of a rectangular or circular sheet containing an active material. Examples of the active material include an active carbon and a polyacenic semiconductor (PAS). Hereinafter, the active material contained in the positive-electrode layer 21 is referred to as a positive-electrode active material. Electric double layers form a capacitor between the positive-electrode active material and the electrolyte and predetermined capacitance [F] generates. The capacitance of the positive-electrode layer 21 is defined by the product of the amount [g] of the positive-electrode active material, the surface area [$m^2/g$] of the positive-electrode active material, and the specific capacity [$F/m^2$] of the positive-electrode active material.

Specifically, the positive-electrode layer 21 is manufactured by rolling a mixture of positive-electrode active material particles (e.g., active carbon particles), a conductivity-imparting agent (e.g., ketjen black), and a binder (e.g., polytetrafluoroethylene (PTFE)) into a sheet and cutting the sheet in a predetermined size. The thus manufactured positive-electrode layer 21 can be suitably compressed and deformed by being sandwiched between the bottom surface 14a of the recess 14 and the inner surface 12a of the lid 12. As an example, the positive-electrode layer 21 is formed with a thickness of 0.2 mm.

The negative-electrode layer 22 is formed of a rectangular or circular sheet containing an active material similar to the positive-electrode layer 21. Hereinafter, the active material contained in the negative-electrode layer 22 is referred to as a negative-electrode active material. The negative-electrode active material may be identical to the positive-electrode active material. Thus, if the positive-electrode active material is the active carbon, the negative-electrode active material may also be the active carbon. Also in the negative-electrode layer 22, electrolyte ions are adsorbed onto a surface of the negative-electrode active material and electric double layers are formed. The capacitance [F] of the negative-electrode layer 22 is also defined by the product of the amount [g] of the negative-electrode active material, the surface area [$m^2/g$] of the negative-electrode active material, and the specific capacity [$F/m^2$] of the negative-electrode active material. The negative-electrode active material is identical to the positive-electrode active material, and hence has the same specific capacity as that of the positive-electrode active material.

Similar to the positive-electrode layer 21, the negative-electrode layer 22 is also manufactured by rolling a mixture of negative-electrode active material particles (e.g., active carbon particles), a conductivity-imparting agent (e.g., ketjen black), and a binder (e.g., polytetrafluoroethylene (PTFE)) into a sheet and cutting the sheet in a predetermined size. The thus manufactured negative-electrode layer 22 can be suitably compressed and deformed by being sandwiched between the bottom surface 14a of the recess 14 and the inner surface 12a of the lid 12. As an example, the negative-electrode layer 22 is formed with a thickness of 0.2 mm.

The separator 23 is provided between the positive-electrode layer 21 and the negative-electrode layer 22. The separator 23 is made of an insulating material capable of retaining the electrolyte 30. The separator 23 is made of a porous material through which ions can pass in a thickness direction thereof. For example, the separator 23 is made of a polyolefin-based organic material or non-woven fabric. In this embodiment, the separator 23 is made of a non-woven fabric containing glass fibers. However, the non-woven fabric containing glass fibers may be replaced by a non-woven fabric of another fiber material such as a cellulose fiber and a plastic fiber. The thickness of the separator 23 is not particularly limited. For example, the separator 23 has a thickness from 0.05 to 0.2 mm.

The separator 23 is formed in an almost rectangular shape larger than the positive-electrode layer 21 and the negative-electrode layer 22. The separator 23 includes a first surface 231 and a second surface 232. The first surface 231 is held in contact with the positive-electrode layer 21. The second surface 232 is held in contact with the negative-electrode layer 22. The separator 23 can be compressed and deformed in the thickness direction, and hence is housed in the liquid chamber

40 while being suitably compressed and deformed between the positive-electrode layer 21 and the negative-electrode layer 22. Thus, internal resistance between the positive-electrode layer 21 and the negative-electrode layer 22 is reduced.

The electrolyte 30 is not particularly limited. Any electrolyte material is applicable to the electrolyte 30. To the electrolyte 30, for example, a quaternary ammonium salt solution including $BF_4$— (tetrafluoroborate ion), more particularly, a 5-azoniaspiro[4.4]nonane-$BF_4$ or ethylmethylimidazolium-nonane-$BF_4$ solution is applicable.

[Structure]

The electrochemical device 101 according to this embodiment includes a structure 50. The structure 50 compresses and deforms the storage element 20 to form, in an area of the separator 23 that is sandwiched between the positive-electrode layer 21 and the negative-electrode layer 22, a thin wall portion 23a having a smaller thickness than that in a peripheral portion around the area.

In this embodiment, the structure 50 includes a first structure 51 and the second structure 52. The first structure 51 is provided in the bottom surface 14a of the recess 14. The second structure 52 is provided in the inner surface 12a of the lid 12.

The first structure 51 is formed in an island shape on the bottom surface 14a of the recess 14 to protrude from the bottom surface 14a to the storage element 20 (positive-electrode layer 21). The second structure 52 is formed in an island shape on the inner surface 12a of the lid 12 to protrude from the inner surface 12a to the storage element 20 (negative-electrode layer 22).

The first and second structures 51 and 52 are made of a harder material than that of the positive-electrode layer 21 and the negative-electrode layer 22. The first structure 51 is embedded in the positive-electrode layer 21. The second structure 52 is embedded in the negative-electrode layer 22.

The first structure 51 does not need to be entirely embedded in an inside of the positive-electrode layer 21. At least a part of the first structure 51 only needs to be embedded in the positive-electrode layer 21. Similarly, the second structure 52 does not need to be entirely embedded in an inside of the negative-electrode layer 22. At least a part of the second structure 52 only needs to be embedded in the negative-electrode layer 22.

The first and second structures 51 and 52 compress and deform the storage element 20 in the thickness direction (Z-axis direction) within the liquid chamber 40 to form the thin wall portion 23a in the separator 23. In this embodiment, the first and second structures 51 and 52 are provided in the bottom surface 14a of the recess 14 and the inner surface 12a of the lid 12, respectively, to be opposed to each other in the Z-axis direction. Therefore, the storage element 20 is, at both surfaces thereof, compressed and deformed by the first and second structures 51 and 52, such that the single thin wall portion 23a is formed in the separator 23.

The thickness of the thin wall portion 23a is not particularly limited. For example, the thin wall portion 23a has a thickness from 5 μm to 50 μm inclusive. In this case, a difference in thickness between the thin wall portion 23a and an outermost peripheral portion of the separator 23 is in a range of 10 μm to 150 μm inclusive, for example.

The first and second structures 51 and 52 are made of a cured conductive adhesive. Accordingly, stable electrical connections between the positive-electrode layer 21 and the via-holes 15a and between the negative-electrode layer 22 and the lid 12 can be ensured. Further, the first and second structures 51 and 52 are embedded in the inside of the positive-electrode layer 21 and the inside of the negative-electrode layer 22, respectively. Therefore, strong adhesion between the first structure 51 and the positive-electrode layer 21 and between the second structure 52 and the negative-electrode layer 22 are ensured.

The first protrusion 51 constitutes a positive-electrode adhesive layer that bonds and electrically connects the positive-electrode layer 21 and the bottom surface 14a of the recess 14 to each other. The first protrusion 51 is formed in a partial area between the bottom surface 14a of the recess 14 and the positive-electrode layer 21. In this embodiment, as shown in FIG. 4, the first structure 51 is formed in a size to cover the three via-holes 15a. Thus structure, the via-holes 15a are protected from corrosion due to contact with the electrolyte 30.

For the conductive adhesive forming the first protrusion 51, a synthetic resin material containing conductive particles is used. Those having high conductivity and chemical stability are favorably used as the conductive particles. For example, graphite particles are used as the conductive particles. One having a low degree of swelling in the electrolyte and high thermal resistance and chemical stability is favorably used as the synthetic resin material containing the conductive particles. For example, a phenol resin is used as the synthetic resin material containing the conductive particles.

The first structure 51 is formed in a circular dome shape. Thus, the thin wall portion 23a can be stably formed in the separator 23 via the positive-electrode layer 21. The first structure 51 is embedded in the positive-electrode layer 21. Thus, the first structure 51 locally compresses the first surface 231 of the separator 23 via the positive-electrode layer 21 to form, in the first surface 231, a dimple D1 having a predetermined depth as a trace of compression. The dimple D1 is formed in the area of the separator 23 that is sandwiched between the positive-electrode layer 21 and the negative-electrode layer 22, the dimple D1 being spaced from the peripheral portion around the area. In this manner, the dimple D1 forms a part of the thin wall portion 23a.

A method of forming the first structure 51 is not particularly limited. For example, various application methods such as a screen printing method and a potting method may be used. The first structure 51 is formed in the dome shape, and hence the thin wall portion 23a having a desired size can be formed without applying too large stress to the positive-electrode layer 21.

The height of the first structure 51 is not particularly limited and can be appropriately set depending on the height of the liquid chamber 40, the thickness and elastic modulus of the positive-electrode layer 21, the thickness of the thin wall portion 23a, and the like. For example, the first structure 51 has a height of 10 μm to 100 μm inclusive. If the height of the first structure 51 is smaller than 10 μm, it is difficult to form the thin wall portion 23a. If the height of the first structure 51 is larger than 100 μm, there is a fear that excess stress may be applied to the positive-electrode layer 21, which may damage the positive-electrode layer 21.

Meanwhile, the second structure 52 constitutes a negative-electrode adhesive layer that bonds and electrically connects the negative-electrode layer 22 and the inner surface 12a of the lid 12 to each other. The second structure 52 is formed in a partial area between the inner surface 12a of the lid 12 and the negative-electrode layer 22. Similar to the first structure 51, for the conductive adhesive forming the second structure 52, a synthetic resin material containing conductive particles is used. For the synthetic resin material, the same or a different kind of conductive adhesive as/from the conductive adhesive forming the first structure 51 can be used.

Similar to the first structure 51, the second structure 52 is also formed in a circular dome shape. Thus, the thin wall portion 23a can be stably formed in the separator 23 via the negative-electrode layer 22. The second structure 52 is embedded in the negative-electrode layer 22. The second structure 52 locally compresses the second surface 232 of the separator 23 via the negative-electrode layer 22 to form, in the second surface 232, a dimple D2 having a predetermined depth as a trace of compression. The dimple D2 is formed in the area of the separator 23 that is sandwiched between the positive-electrode layer 21 and the negative-electrode layer 22, the dimple D2 being spaced from the peripheral portion around the area. In this manner, the dimple D2 forms a part of the thin wall portion 23a.

A method of forming the second structure 52 is not particularly limited. For example, various application methods such as a screen printing method and a potting method may be used. The second structure 52 is formed in the dome shape, and hence the thin wall portion 23a having a desired size can be formed without applying too large stress to the negative-electrode layer 22.

The height of the second structure 52 is not particularly limited and can be appropriately set depending on the height of the liquid chamber 40, the thickness and elastic modulus of the negative-electrode layer 22, the thickness of the thin wall portion 23a, and the like. For example, the second structure 52 has a height of 10 µm to 100 µm inclusive. If the height of the second structure 52 is smaller than 10 µm, it is difficult to form the thin wall portion 23a. If the height of the second structure 52 is larger than 100 µm, there is a fear that excess stress may be applied to the negative-electrode layer 22, which may damage the negative-electrode layer 22.

In this embodiment, the shape, size, and height of the second structure 52 are set to be the same as those of the first structure 51. However, the shape, size, and height of the second structure 52 are not limited thereto. For example, at least one of the shape, size, and height of the second structure 52 may be set to be different from that of the first structure 51.

Figure 5:
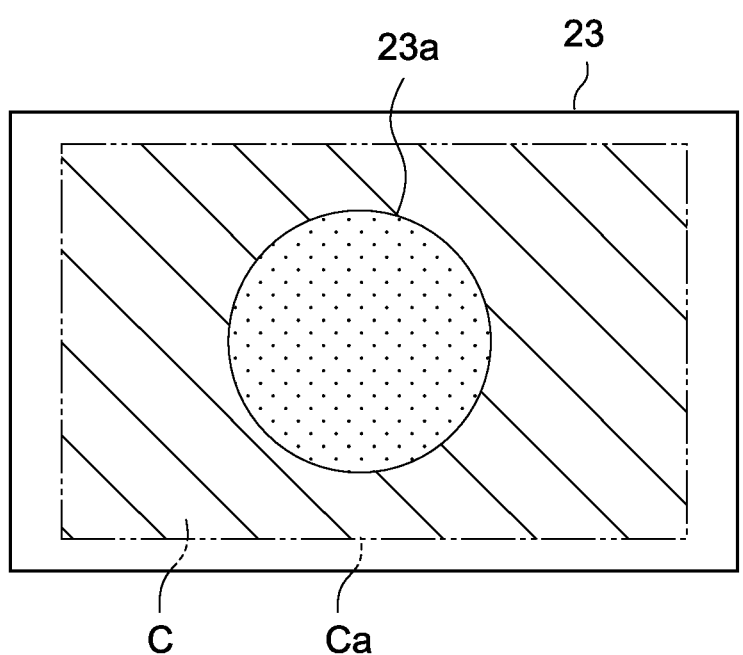
FIG. 5 is a schematic plan view of a separator constituting the electrochemical device, which shows a form of a thin wall portion formed in the separator.

FIG. 5 is a plan view of the separator 23 in which the thin wall portion 23a is formed. In the figure, an area C indicated by hatching represents the area of the separator 23 that is sandwiched between the positive-electrode layer 21 and the negative-electrode layer 22 and a dotted area shows the thin wall portion 23a. The first and second structures 51 and 52 are formed in the dome shape on the bottom surface 14a of the recess 14 and the inner surface 12a of the lid 12, respectively. As shown in FIG. 5, the first and second structures 51 and 52 form the thin wall portion 23a at positions spaced from a peripheral portion Ca around the area C within the area C.

[Action of this Embodiment]

In the electrochemical device 101 according to this embodiment configured in the above-mentioned manner, the first and second structures 51 and 52 are made of a cured conductive adhesive embedded in the positive-electrode layer 21 and the negative-electrode layer 22, respectively. Thus, favorable adhesion properties and electrical connections between the positive-electrode layer 21 and the bottom surface 14a of the recess 14 (via-holes 15a) and between the negative-electrode layer 22 and the inner surface 12a of the lid 12 can be ensured.

Therefore, according to this embodiment, without forming adhesive layers on entire surfaces of the both electrode layers, the electrode layers can be held in close contact with the inner surfaces of the container. Therefore, the thickness of the electrochemical device 101 can be reduced. Further, a reduction in thickness of the device can be achieved without reducing the thickness of the electrode layer. Deterioration of a storage property of the device can be prevented.

Further, in this embodiment, the thin wall portion 23a includes the dimple D1 and the dimple D2. The thin wall portion 23a is formed by being compressed and deformed by the first and second structures 51 and 52. Therefore, the thin wall portion 23a is thinner than an area C in the peripheral portion Ca. The thickness of the thin wall portion 23a gradually decreases toward the central portion corresponding to the shape of the dimples D1 and D2.

As mentioned above, the separator 23 is compressed by a predetermined of amount in a thickness direction upon assembling (sealing). At this time, the thin wall portion 23a is compressed and deformed more largely than other areas within the area C by the first and second structures 51 and 52. However, the thin wall portion 23a is provided at a position spaced from the peripheral portion Ca around the area C toward a center side of the separator 23. Therefore, the amount of electrolyte pushed to an outside of the area C when the thin wall portion 23a is formed can be reduced. Thus, it is possible to suppress penetration or contamination of the electrolyte 30 into/of the joining portion between the container main body 11 and the lid 12. Therefore, stable bonding workability can be ensured and production efficiency is increased.

Further, the separator 23 is made of non-woven cloth containing glass fibers. Thus, the thin wall portion 23a is denser than the other areas of the separator 23. The electrolyte 30 is collected into the thin wall portion due to capillary action and the amount of liquid retained in the thin wall portion 23a increases. Therefore, for example, even when the amount of electrolyte in the container 10 is reduced due to decomposition of the electrolyte due to a long-term use, the electrolyte can be collected into the thin wall portion 23a of the separator 23. A stable operation of the electrochemical device 101 over a long-term can be ensured.

Second Embodiment

Figure 6:
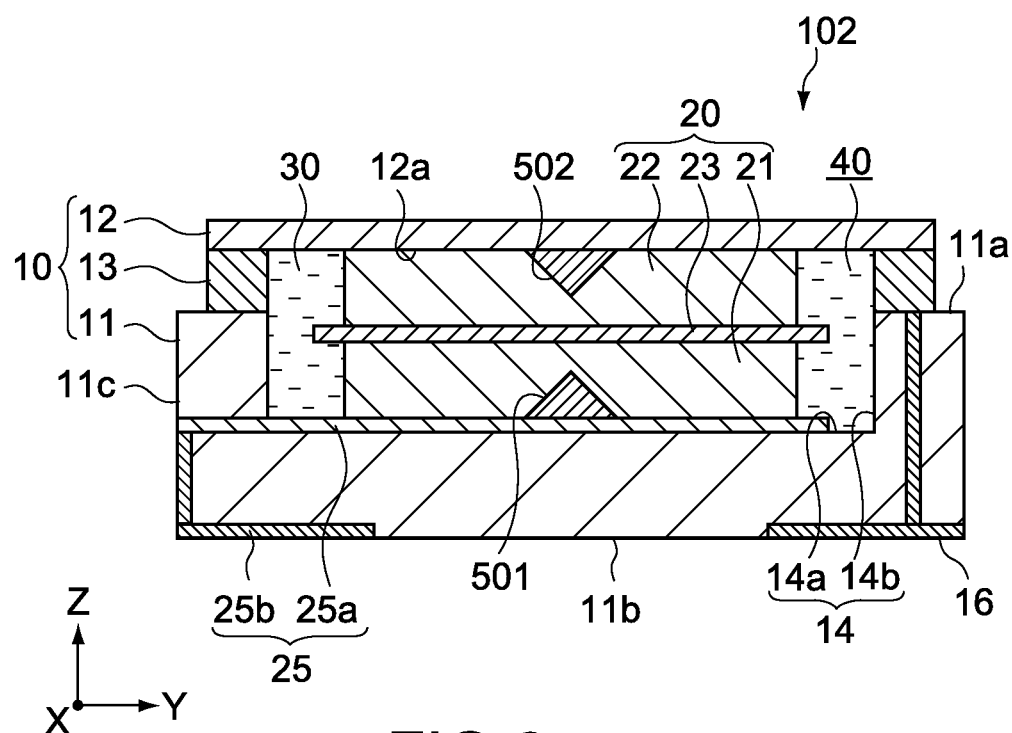
FIG. 6 is a schematic cross-sectional view showing a configuration of an electrochemical device according to a second embodiment of the present disclosure.

FIG. 6 is a schematic cross-sectional view showing a configuration of the electrochemical device according to a second embodiment of the present disclosure. Hereinafter, configurations different from those of the first embodiment will be mainly described. The same configurations as those of the above-mentioned first embodiment will be denoted by the same reference symbols, and descriptions thereof will be omitted or simplified.

In an electrochemical device 102 according to this embodiment, a configuration of a positive-electrode wiring 25 and forms of first and second structures 501 and 502 are different from those of the first embodiment.

In this embodiment, the positive-electrode wiring 25 includes a wiring layer 25a and an external positive-electrode terminal 25b. The wiring layer 25a is provided between a positive-electrode layer 21 and a bottom surface 14a of a recess 14. The external positive-electrode terminal 25b is formed from a side surface 11c of a container main body 11 to a lower surface 11b. The wiring layer 25a is pulled out to an outside to pass through a side wall forming the side surface 11c of the container main body 11. The wiring layer 25a is connected to the external positive-electrode terminal 25b.

The first structure 501 is provided in the bottom surface 14a of the recess 14 via the wiring layer 25a. The second structure 502 is provided on an inner surface 12a of a lid 12 to be opposed to the first structure 501. The first structure 501 is embedded in an inside of the positive-electrode layer 21. The second structure 502 is embedded in an inside of a negative-electrode layer 22.

Figure 7:
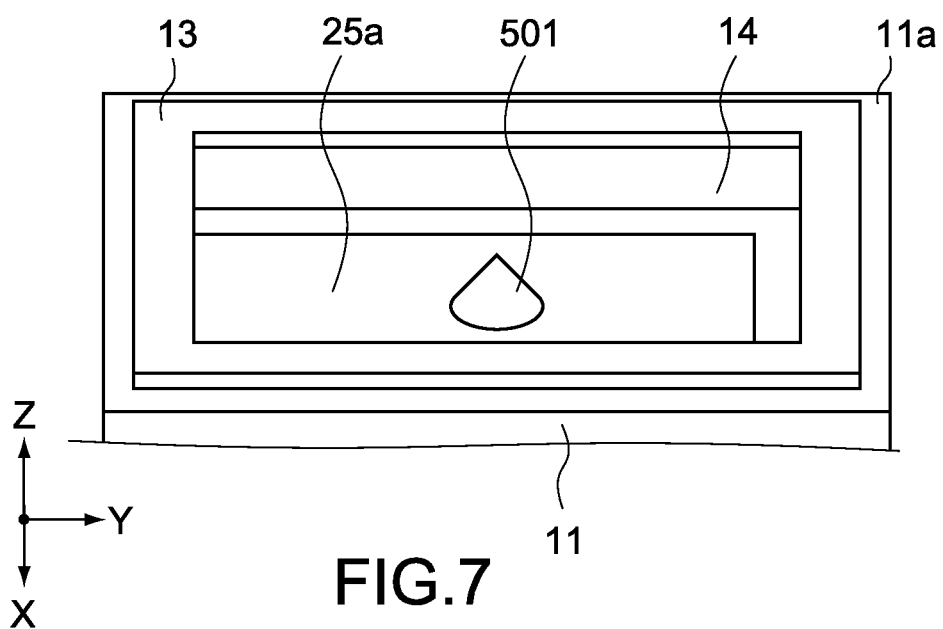
FIG. 7 is a schematic perspective view showing a state of an inside of a container main body in the second embodiment.

FIG. 7 is a schematic perspective view showing a state of an inside of the container main body 11. The first and second structures 501 and 502 are made of a cured conductive adhesive. The first and second structures 501 and 502 have an almost circular cone shape. The first and second structures 501 and 502 are embedded in the insides of the electrode layers 21 and 22 to stick in almost central portions of the positive-electrode layer 21 and the negative-electrode layer 22, respectively.

The first and second structures 501 and 502 have an almost circular cone shape. Therefore, it is possible to easily embed the first and second structures 501 and 502 in the positive-electrode layer 21 and the negative-electrode layer 22 and to restrain a relative movement of a storage element 20 (positive-electrode layer 21 and negative-electrode layer 22) with respect to the inner surfaces (14a and 12a) of a container 10.

The shape of the first and second structures 501 and 502 is not limited to a circular cone shape and may be another sharp-pointed shape such as a pyramid shape. Further, the first and second structures 501 and 502 may be formed in a column shape (cylindrical shape or prism shape) having a relatively high aspect ratio (ratio of diameter of bottom surface to height) or may be formed in a columnar shape with a sharp end portion. Alternatively, the first and second structures 501 and 502 may have a shape having a relatively low aspect ratio. As long as the first and second structures 501 and 502 can be at least partially embedded in the insides of the electrode layers 21 and 22, the shape is not particularly limited.

Also in the electrochemical device 102 according to this embodiment configured in the above-mentioned manner, the action as in the above-mentioned first embodiment can be provided. Further, in this embodiment, a thin wall portion 23a as described in the first embodiment may be formed or does not need to be formed in an area of a separator 23 that is sandwiched between the positive-electrode layer 21 and the negative-electrode layer 22 (the same is applied to the following embodiments).

Third Embodiment

Figure 8:
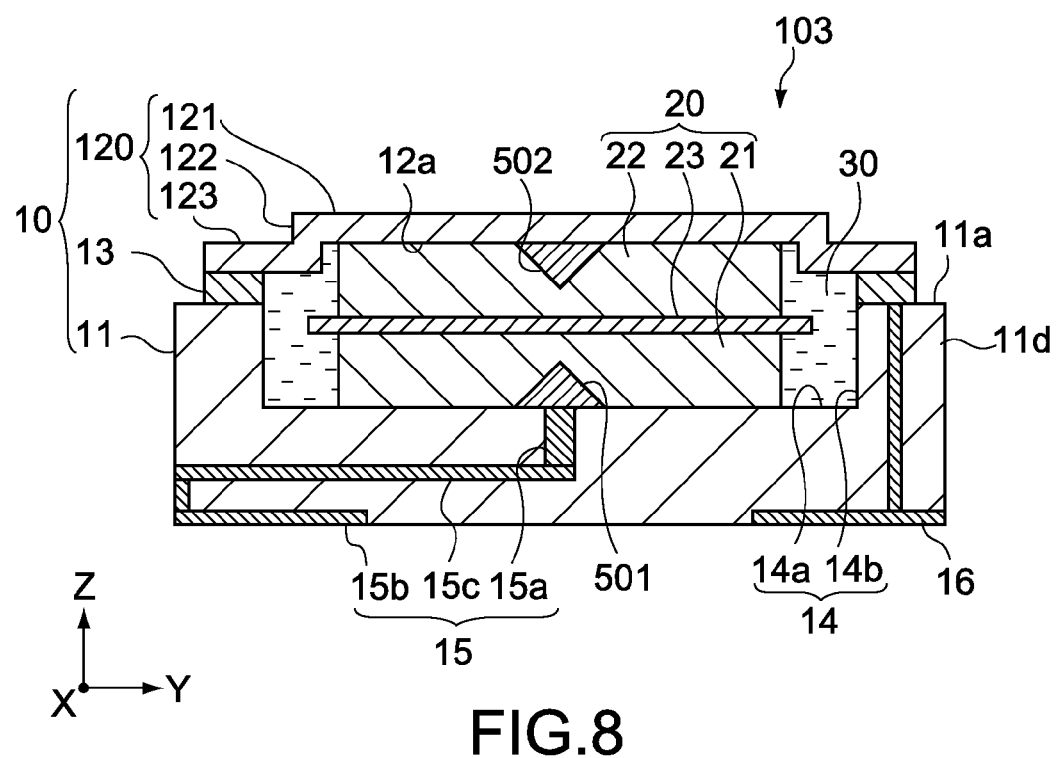
FIG. 8 is a schematic cross-sectional view showing a configuration of an electrochemical device according to a third embodiment of the present disclosure.
Figure 9:
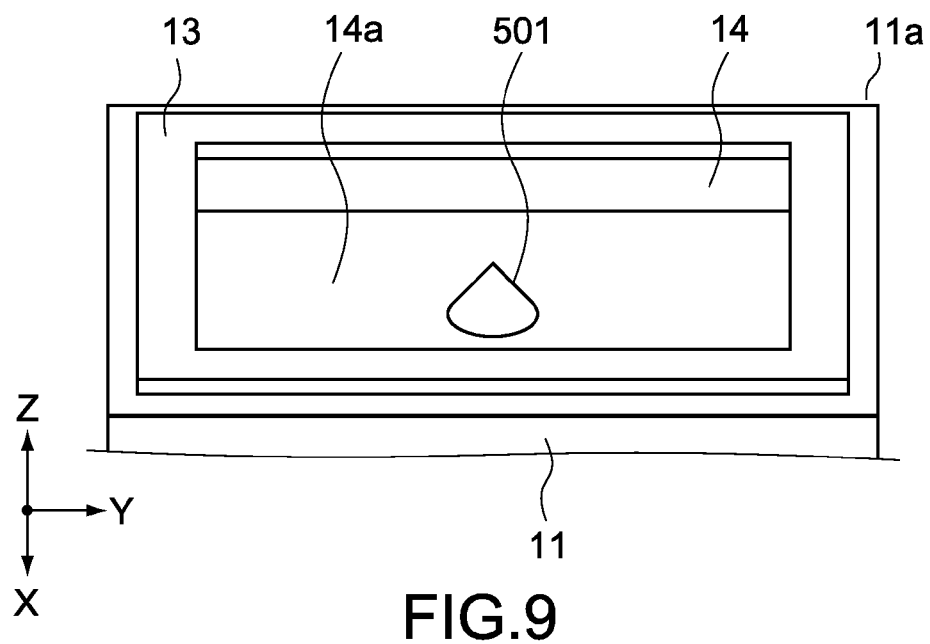
FIG. 9 is a schematic perspective view showing a state of an inside of the container main body in the third embodiment.

FIG. 8 is a schematic cross-sectional view showing a configuration of an electrochemical device according to a third embodiment of the present disclosure. FIG. 9 is a schematic perspective view showing a state of an inside of a container main body of the electrochemical device. Hereinafter, configurations different from those of the above-mentioned embodiments will be mainly described. The same configurations as those of the above-mentioned embodiments will be denoted by the same reference symbols, and descriptions thereof will be omitted or simplified.

In an electrochemical device 103 according to this embodiment, a configuration of a lid 120 constituting a container 10 is different from that of the above-mentioned first embodiment. That is, in this embodiment, the lid 120 is constituted of a press-molded body formed by bending a metal plate having an even thickness such that a central portion thereof projects outwards.

The lid 120 includes a flat plate portion 121, a peripheral wall portion 122, and a joining portion 123. The flat plate portion 121 includes an inner surface 12a to be bonded to a negative-electrode layer 22. The peripheral wall portion 122 is formed in a rectangular annular shape surrounding the flat plate portion 121 to be opposed to a peripheral surface of the negative-electrode layer 22. The joining portion 123 is provided in a rectangular annular shape around the peripheral wall portion 122 and joined to a container main body 11 via a seal ring 13.

Meanwhile, the electrochemical device 103 according to this embodiment includes a positive-electrode wiring 15 and first and second structures 501 and 502. The positive-electrode wiring 15 has the same configuration as that of the above-mentioned first embodiment. The first and second structures 501 and 502 have the same configurations as those of the above-mentioned second embodiment. The first structure 501 is formed to cover a via-hole 15a exposed from a bottom surface of a recess 14. The first structure 501 functions to protect the via-hole 15a from an electrolyte 30.

Also in the electrochemical device 103 according to this embodiment configured in the above-mentioned manner, the same action as that of the first embodiment can be provided. In this embodiment, the lid 120 is formed in not a flat shape but a three-dimensional shape. Therefore, the strength of the lid 120 increases. Thus, it is possible to increase durability of the container 10. Such a configuration of the lid 120 may also be applicable to the first and second embodiments.

Fourth Embodiment

Figure 10:
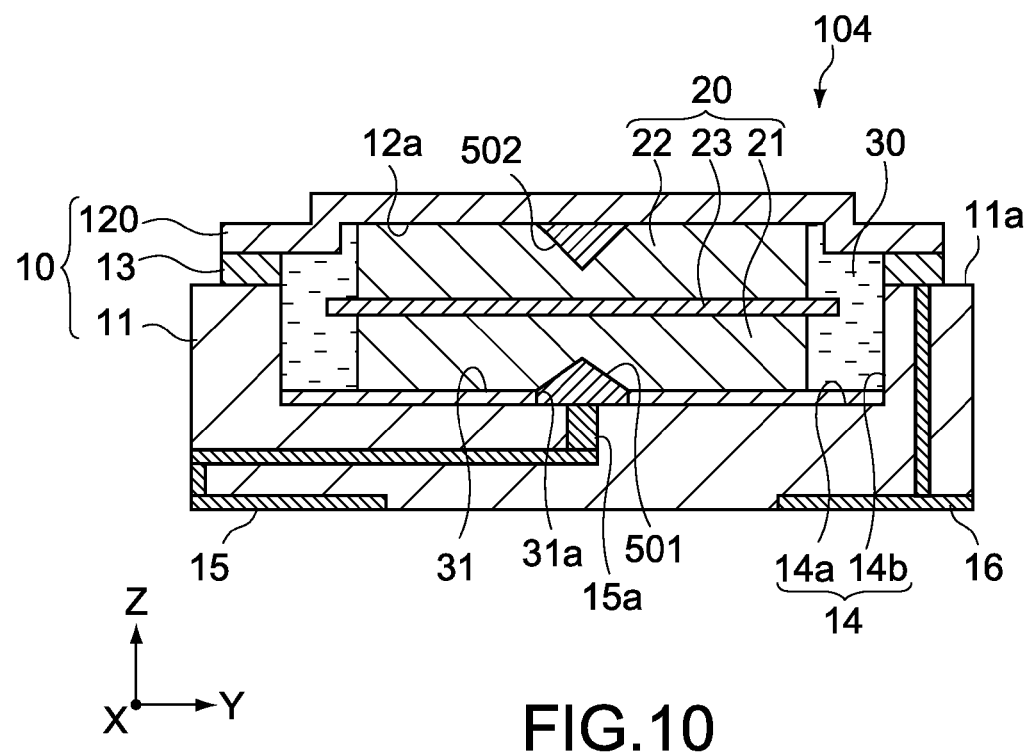
FIG. 10 is a schematic cross-sectional view showing a configuration of an electrochemical device according to a fourth embodiment of the present disclosure.
Figure 11:
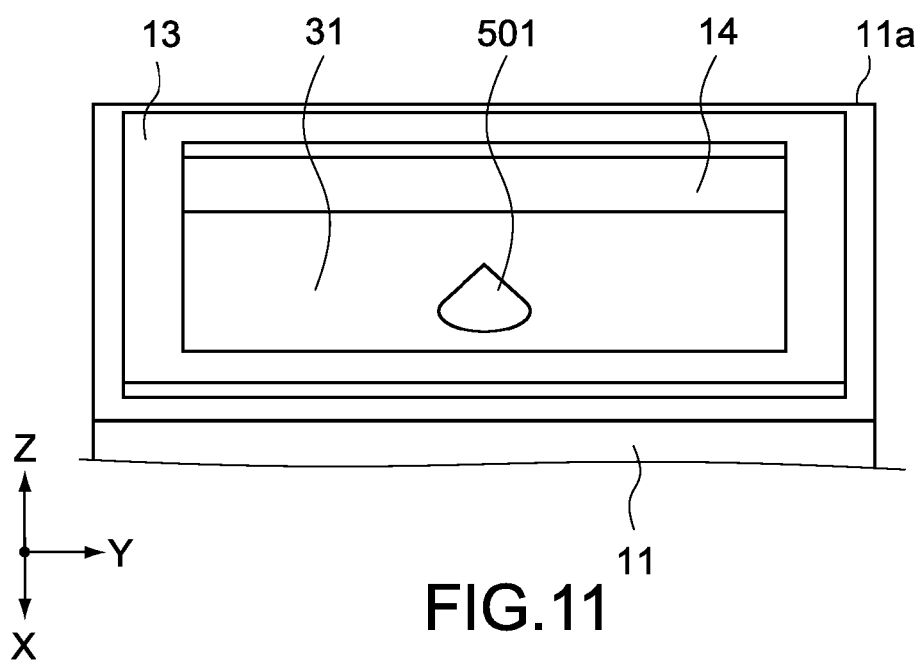
FIG. 11 is a schematic perspective view showing a state of an inside of a container main body in the fourth embodiment.

FIG. 10 is a schematic cross-sectional view showing a configuration of an electrochemical device according to a fourth embodiment of the present disclosure. FIG. 11 is a schematic perspective view showing a state of an inside of the container main body of the electrochemical device. Hereinafter, configurations different from those of the above-mentioned embodiments will be mainly described. The same configurations as those of the above-mentioned embodiments will be denoted by the same reference symbols, and descriptions thereof will be omitted or simplified.

An electrochemical device 104 according to this embodiment is different from that of the above-mentioned embodiments in that a spacer 31 (auxiliary layer) is provided between a bottom surface 14a of a recess 14 of a container main body 11 and a positive-electrode layer 21.

The spacer 31 includes a through-hole 31a through which a first structure 501 passes. The through-hole 31a is formed in a shape corresponding to an outer peripheral shape of the first structure 501. The first structure 501 is supported by a peripheral wall of the through-hole 31a. Further, the spacer 31 is formed in a shape corresponding to an inner peripheral shape of the bottom surface 14a of the recess 14. A periphery of the spacer 31 is supported by each of side surfaces 14b of the recess 14.

The spacer 31 may be made of a conductive material or an electrical insulating material. The thickness of the spacer 31 is not particularly limited. In order to ensure an embedded structure of the first structure 501 in the positive-electrode layer 21, it is necessary to set the thickness of the spacer 31 to be smaller than the height of the first structure 501.

Also in the electrochemical device 104 according to this embodiment configured in the above-mentioned manner, the same action as that of the first embodiment can be provided. In this embodiment, the spacer 31 is provided around the first structure 501. Therefore, a joining strength of the first structure 501 to the container main body 11 can be increased. Further, depending on the thickness of the spacer 31, a depth of the first structure 501 embedded in the positive-electrode layer 21 can be adjusted. In addition, variation of the thickness of a storage element 20 and variation of the depth of the recess 14 can be overcome, which can achieve stable quality of the device.

Fifth Embodiment

Figure 12:
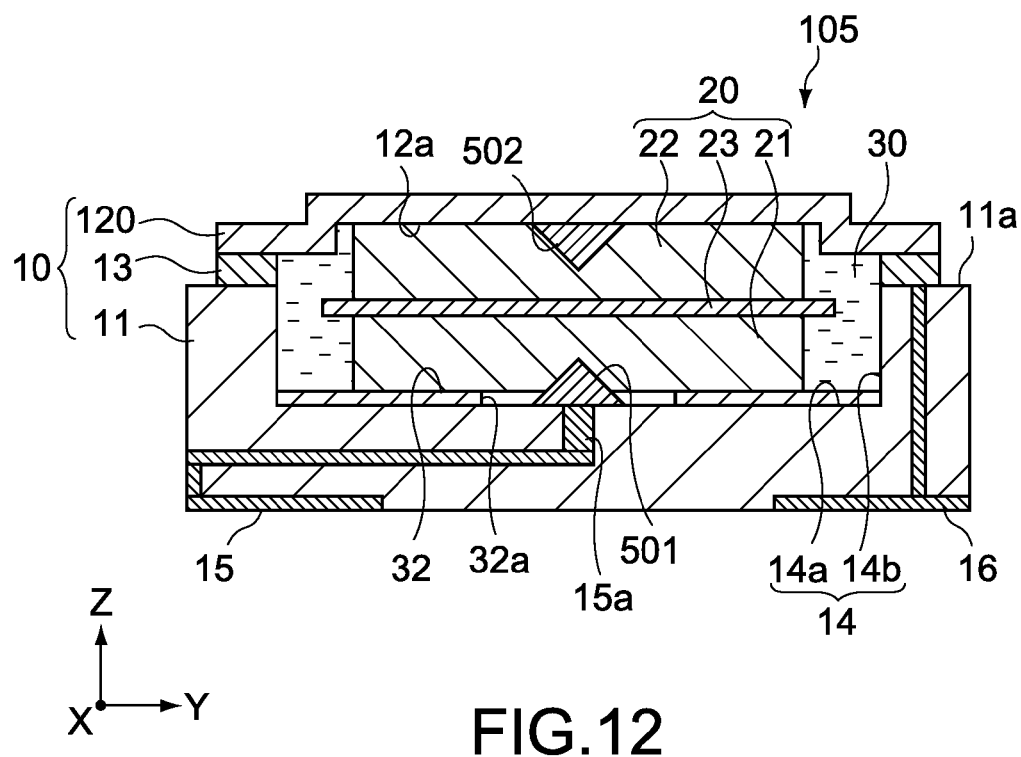
FIG. 12 is a schematic cross-sectional view showing a configuration of an electrochemical device according to a fifth embodiment of the present disclosure.
Figure 13:
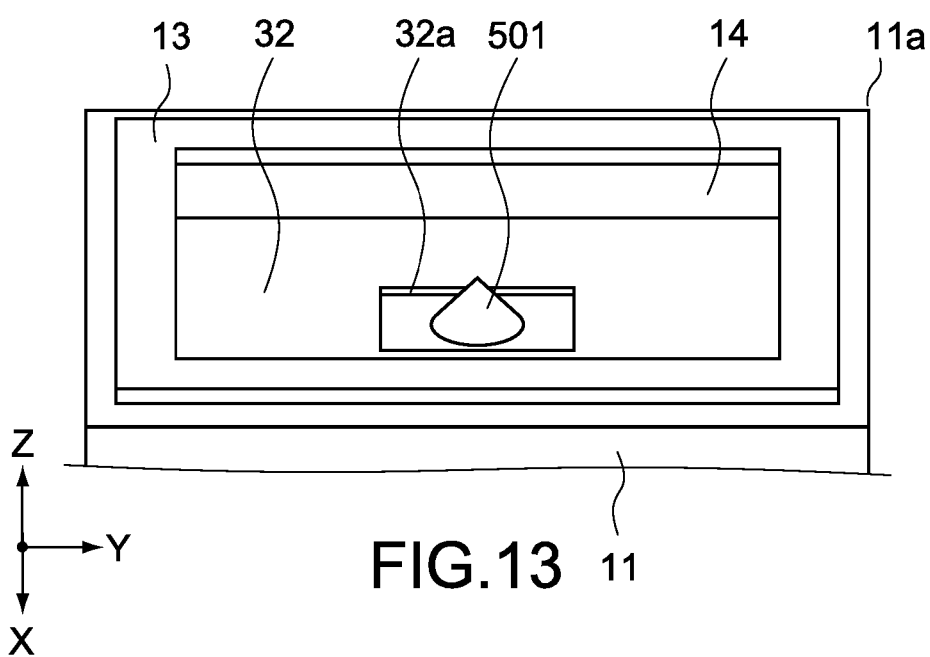
FIG. 13 is a schematic perspective view showing a state of an inside of a container main body in the fifth embodiment.

FIG. 12 is a schematic cross-sectional view showing a configuration of an electrochemical device according to a fifth embodiment of the present disclosure. FIG. 13 is a schematic perspective view showing an inside of a container main body of the electrochemical device. Hereinafter, configurations different from those of the above-mentioned embodiments will be mainly described. The same configurations as those of the above-mentioned embodiments will be denoted by the same reference symbols, and descriptions thereof will be omitted or simplified.

An electrochemical device 105 according to this embodiment is common to those of the above-mentioned fourth embodiment in that a spacer 32 (auxiliary layer) is provided between a bottom surface 14a of a recess 14 of a container main body 11 and a positive-electrode layer 21. The size of a through-hole 32a through which a first structure 501 passes is different from that of the above-mentioned fourth embodiment. That is, in this embodiment, a through-hole 32a of the spacer 32 through which the first structure 501 passes is formed to be larger than the first structure 501. The through-hole 32a is formed in a rectangular shape. Alternatively, the through-hole 32a may be formed in a circular shape or another geometric shape.

According to this embodiment, as in the fourth embodiment, depending on the thickness of the spacer 32, a depth of the first structure 501 embedded in the positive-electrode layer 21 can be adjusted. In addition, variation of the thickness of a storage element 20 and variation of the depth of the recess 14 can be overcome, which can achieve stable quality of the device. In addition, according to this embodiment, the through-hole 32a of the spacer 32 is formed to be larger than the first structure 501. Therefore, highly accurate positioning between the spacer 32 and the first structure 501 becomes unnecessary. The spacer 32 or the first structure 501 can be easily formed.

Sixth Embodiment

Figure 14:
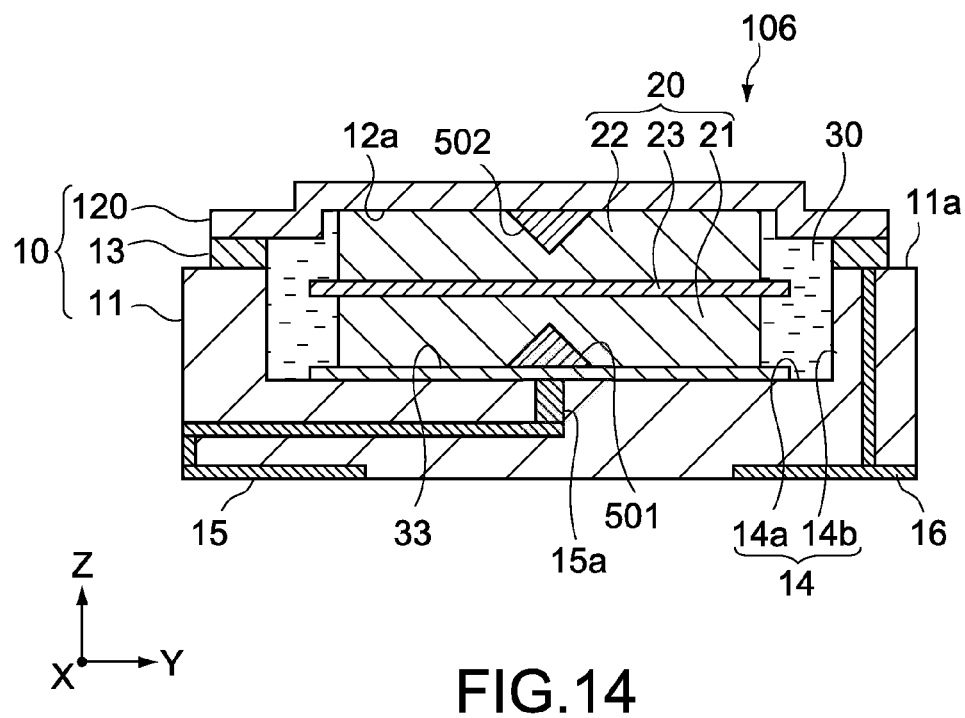
FIG. 14 is a schematic cross-sectional view showing a configuration of an electrochemical device according to a sixth embodiment of the present disclosure.
Figure 15:
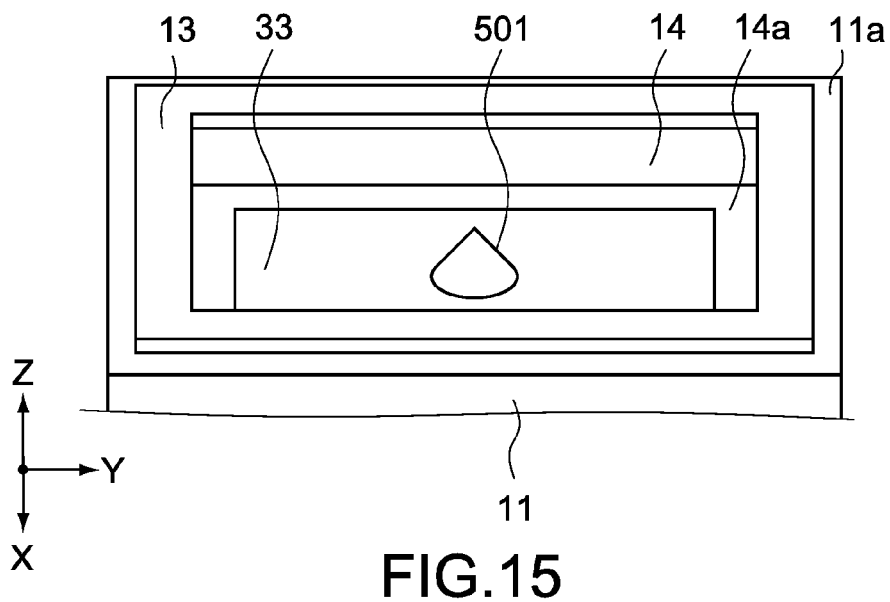
FIG. 15 is a schematic perspective view showing a state of an inside of a container main body in the sixth embodiment.

FIG. 14 is a schematic cross-sectional view showing a configuration of an electrochemical device according to a sixth embodiment of the present disclosure. FIG. 15 is a schematic perspective view showing a state of an inside of a container main body of the electrochemical device. Hereinafter, configurations different from those of the above-mentioned embodiments will be mainly described. The same configurations as those of the above-mentioned embodiments will be denoted by the same reference symbols, and descriptions thereof will be omitted or simplified.

An electrochemical device 106 according to this embodiment is different from that of the above-mentioned embodiments in that a power collection layer 33 is provided between a via-hole 15a of a positive-electrode wiring 15 and a positive-electrode layer 21.

The power collection layer 33 is made of a conductive material provided between a first structure 501 and the via-hole 15a of the positive-electrode wiring 15. In this embodiment, the power collection layer 33 is made of a metal material having durability against an electrolyte 30 such as aluminum.

The power collection layer 33 covers the via-hole 15a exposed from a bottom surface 14a of a recess 14. The power collection layer 33 protects the via-hole 15a from contact with the electrolyte 30. The power collection layer 33 is increased in power collection efficiency in such a manner that the power collection layer 33 is formed on the bottom surface 14a to have a larger area than that of a positive-electrode layer 21. The first structure 501 is formed on the power collection layer 33 and embedded in an inside of the positive-electrode layer 21.

Also in the electrochemical device 106 according to this embodiment configured in the above-mentioned manner, the same action as that of the first embodiment can be provided. The configuration of the power collection layer 33 is not limited to this embodiment and may also be applied to the above-mentioned embodiments.

Seventh Embodiment

Figure 16:
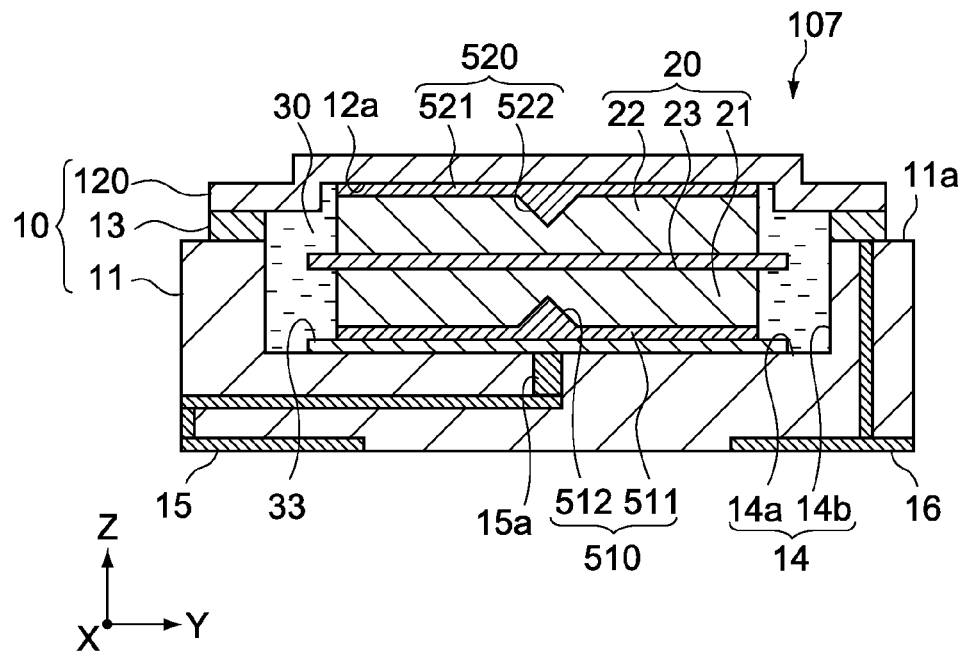
FIG. 16 is a schematic cross-sectional view showing a configuration of an electrochemical device according to a seventh embodiment of the present disclosure.
Figure 17:
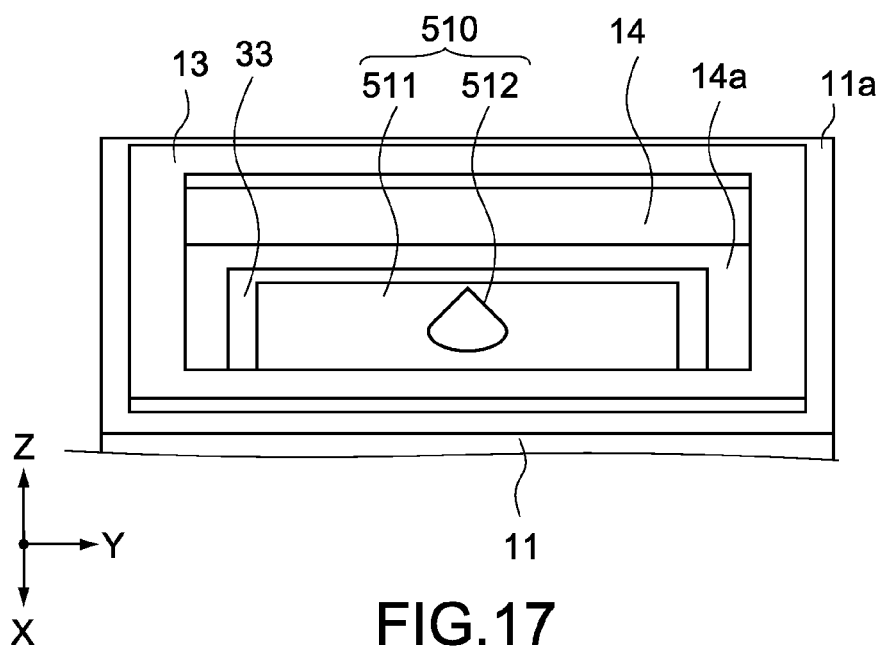
FIG. 17 is a schematic perspective view showing a state of an inside of a container main body in the seventh embodiment.

FIG. 16 is a schematic cross-sectional view showing a configuration of an electrochemical device according to a seventh embodiment of the present disclosure. FIG. 17 is a schematic perspective view showing a state of an inside of a container main body of the electrochemical device. Hereinafter, configurations different from those of the above-mentioned embodiments will be mainly described. The same configurations as those of the above-mentioned embodiments will be denoted by the same reference symbols, and descriptions thereof will be omitted or simplified.

As mentioned above, in an electrochemical device 107 according to this embodiment, configurations of a first structure 510 and a second structure 520 are different from those of the above-mentioned embodiments.

The first structure 510 is provided between a bottom surface 14a of a recess 14 and a positive-electrode layer 21. The first structure 510 is made of a cured conductive adhesive including a base layer 511 and a protrusion 512. The protrusion 512 is formed on the base layer 511.

The base layer 511 is provided between the bottom surface 14a of the recess 14 and the positive-electrode layer 21. Further, the base layer 511 is provided on an almost entire surface of the positive-electrode layer 21. The protrusion 512 has a three-dimensional sharp-pointed shape such as a circular cone shape and a prism shape. The protrusion 512 is provided between the positive-electrode layer 21 and the base layer 511. The protrusion 512 is embedded in an inside of the positive-electrode layer 21 to stick in an almost central portion of the positive-electrode layer 21.

In this embodiment, a power collection layer 33 is provided between the bottom surface 14a of the recess 14 and the base layer 511. The provision of the power collection layer 33 may be omitted depending on needs. The power collection layer 33 has the same configuration as that of the sixth embodiment, and hence a description thereof will be omitted.

Meanwhile, the second structure 520 is provided between an inner surface 12a of a lid 12 and a negative-electrode layer 22. The second structure 520 is also made of a cured conductive adhesive including a base layer 521 and a protrusion 522 formed on the base layer 521. The base layer 521 is provided between the inner surface 12a of the lid 12 and the negative-electrode layer 22. Further, the base layer 521 is provided on an almost entire surface of the negative-electrode layer 22. The protrusion 522 has a three-dimensional sharp-pointed shape such as a circular cone shape and a prism shape. The protrusion 522 is provided between the negative-electrode layer 22 and the base layer 521. The protrusion 522 is embedded in an inside of the negative-electrode layer 22 to stick in an almost central portion of the negative-electrode layer 22.

According to this embodiment, first and second structures 510 and 520 include base layers 511 and 521, respectively. Therefore, adhesion between the positive-electrode layer 21 and the inner surface 12a of the lid 12 and between the negative-electrode layer 22 and the bottom surface 14a of the recess 14 can be increased. Further, the first and second structures 510 and 520 include the protrusions 512 and 522, respectively. Therefore, the base layers 511 and 521 can be formed with a relatively thin thickness. Thus, the thickness of the electrode layers 21 and 22 can be ensured without inhibiting the reduction in thickness of the device. Therefore, deterioration of device properties can also be suppressed.

Eighth Embodiment

Figure 18:
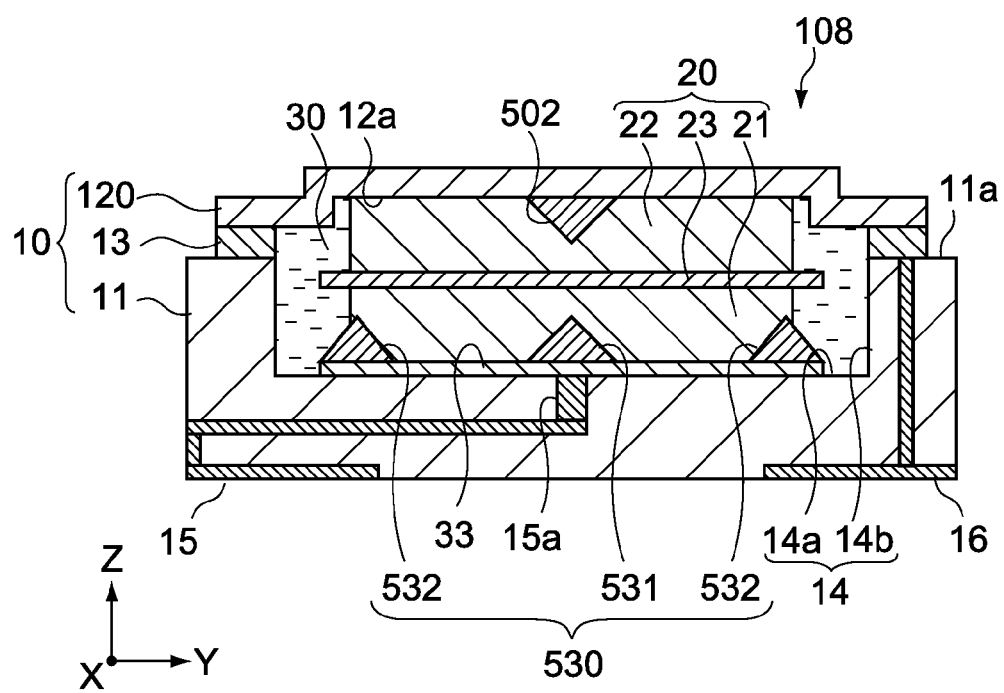
FIG. 18 is a schematic cross-sectional view showing a configuration of an electrochemical device according to an eighth embodiment of the present disclosure.
Figure 19:
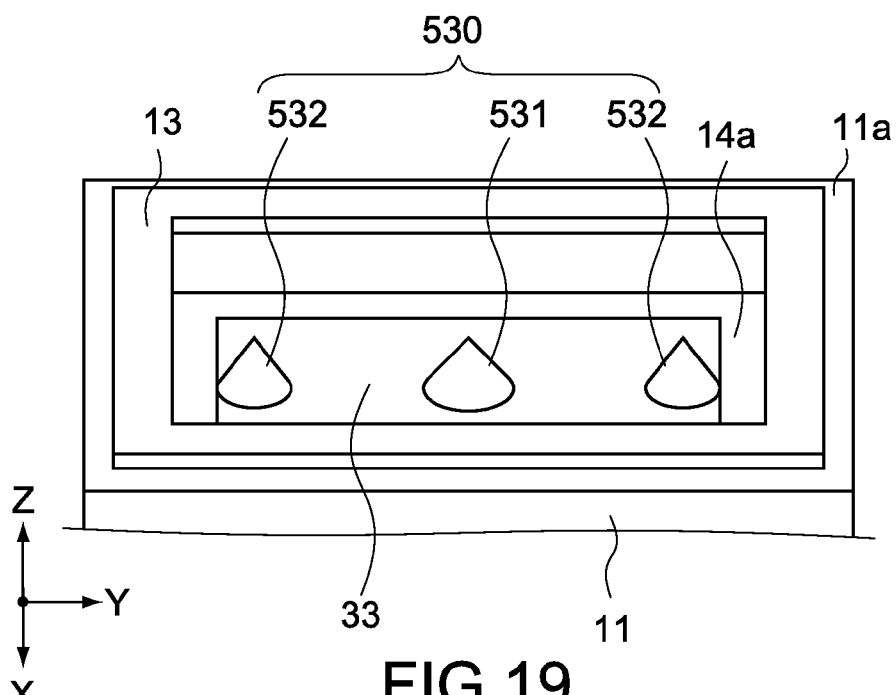
FIG. 19 is a schematic perspective view showing a state of an inside of a container main body in the eighth embodiment.

FIG. 18 is a schematic cross-sectional view showing a configuration of an electrochemical device according to an eighth embodiment of the present disclosure. FIG. 19 is a schematic perspective view showing a state of an inside of a container main body of the electrochemical device. Hereinafter, configurations different from those of the above-mentioned embodiments will be mainly described. The same configurations as those of the above-mentioned embodiments will be denoted by the same reference symbols, and descriptions thereof will be omitted or simplified.

In an electrochemical device 108 according to this embodiment, a first structure 530 includes a plurality of protrusions 531 and 532 made of a cured conductive adhesive. The protrusions 531 and 532 are provided between a bottom surface 14a of a recess 14 and a positive-electrode layer 21. Each of the protrusions 531 and 532 is formed in an almost circular cone shape to be embedded in an inside of the positive-electrode layer 21 to stick in the positive-electrode layer 21.

In this embodiment, a power collection layer 33 is provided between the bottom surface 14a of the recess 14 and the positive-electrode layer 21. The protrusions 531 and 532 are provided on the power collection layer 33. The provision of the power collection layer 33 does not need to be omitted depending on needs. The power collection layer 33 has the same configuration as that of the sixth embodiment. Here, a description thereof will be omitted.

The first structure 530 includes the first protrusion 531 and the two second protrusions 532. The first protrusion 531 is provided in a central portion of the positive-electrode layer 21 and embedded in the positive-electrode layer 21. The two second protrusions 532 are provided in the peripheral portion of the positive-electrode layer 21 and embedded in the positive-electrode layer 21. The number of second protrusions 532 is not limited to two and may be three or more.

Also in this embodiment, the same action as the above-mentioned first embodiment can be provided. According to this embodiment, the first structure 530 is constituted of the plurality of protrusions 531 and 532. Therefore, it is possible to strongly fix the positive-electrode layer 21 to the bottom surface 14a of the recess 14 and to increase adhesion between the bottom surface 14a and the positive-electrode layer 21.

Note that, also in an embodiment in which spacers 31 and 32 (auxiliary layer) described with reference to FIG. 10 or 12 are provided between the bottom surface 14a of the recess 14 and the positive-electrode layer 21 instead of the power collection layer 33, the first structure may be constituted of the plurality of protrusions 531 and 532 described above.

Ninth Embodiment

Figure 20:
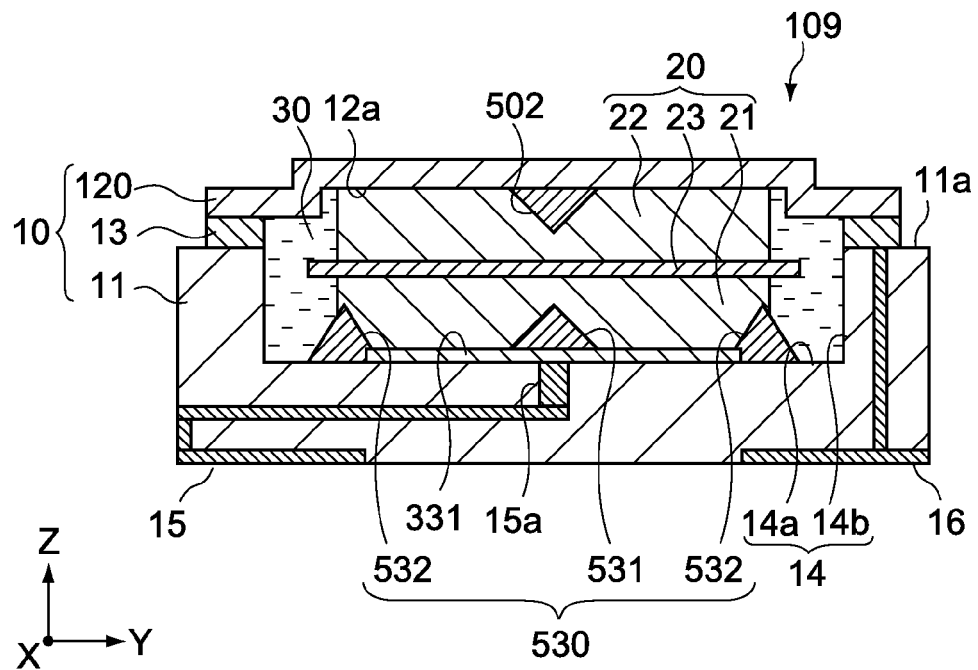
FIG. 20 is a schematic cross-sectional view showing a configuration of an electrochemical device according to a ninth embodiment of the present disclosure.
Figure 21:
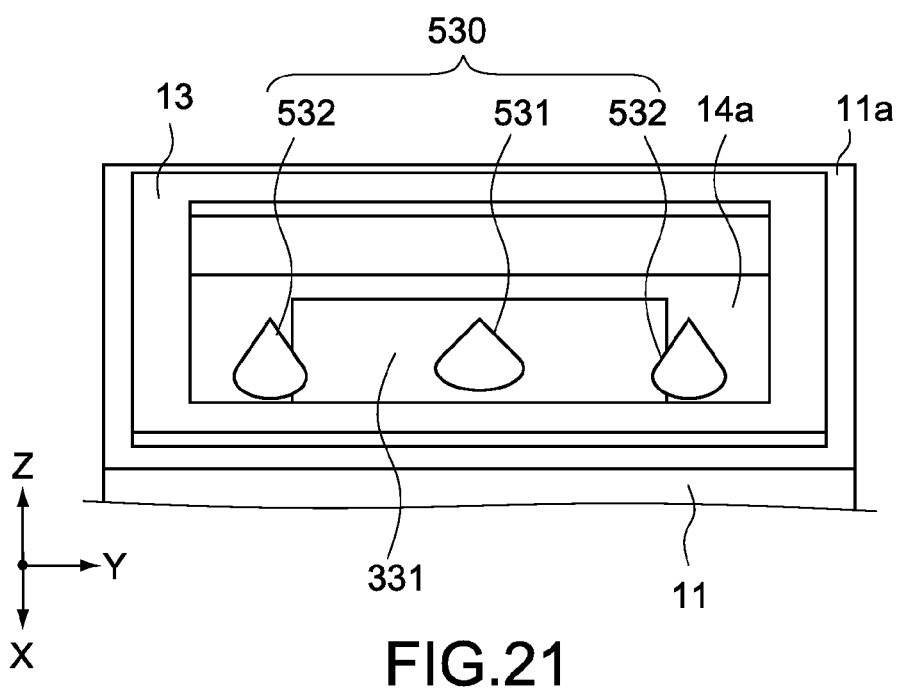
FIG. 21 is a schematic perspective view showing a state of an inside of a container main body in the ninth embodiment.

FIG. 20 is a schematic cross-sectional view showing a configuration of an electrochemical device according to a ninth embodiment of the present disclosure. FIG. 21 is a schematic perspective view showing a state of an inside of a container main body of the electrochemical device. Hereinafter, configurations different from those of the above-mentioned embodiments will be mainly described. The same configurations as those of the above-mentioned embodiments will be denoted by the same reference symbols, and descriptions thereof will be omitted or simplified.

In an electrochemical device 109 according to this embodiment, the size of a power collection layer 331 is different from that of the eighth embodiment. The power collection layer 331 is formed on a bottom surface 14a of a recess 14 to have a smaller area than that of a positive-electrode layer 21. In this case, second protrusions 532 constituting a first structure 530 are formed over a peripheral portion of the power collection layer 331 and the bottom surface 14a of the recess 14. Thus, the same action as that of the fifth embodiment can be provided. Adhesion between the power collection layer 331 and the bottom surface 14a can be increased by the second protrusions 532. The durability of the device can be increased.

Tenth Embodiment

Figure 22:
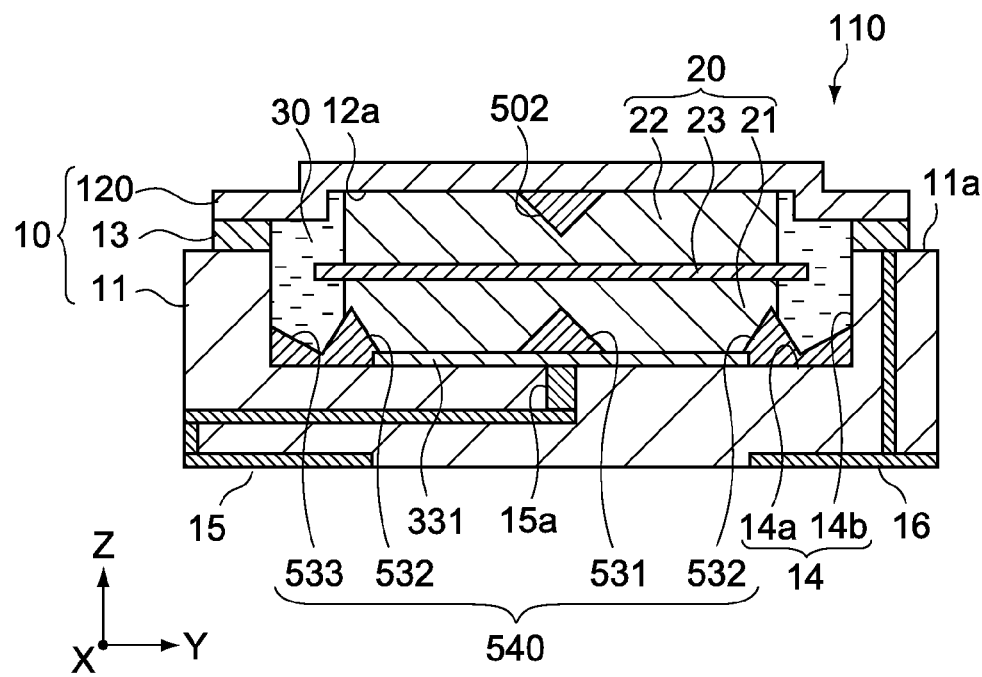
FIG. 22 is a schematic cross-sectional view showing a configuration of an electrochemical device according to a tenth embodiment of the present disclosure.
Figure 23:
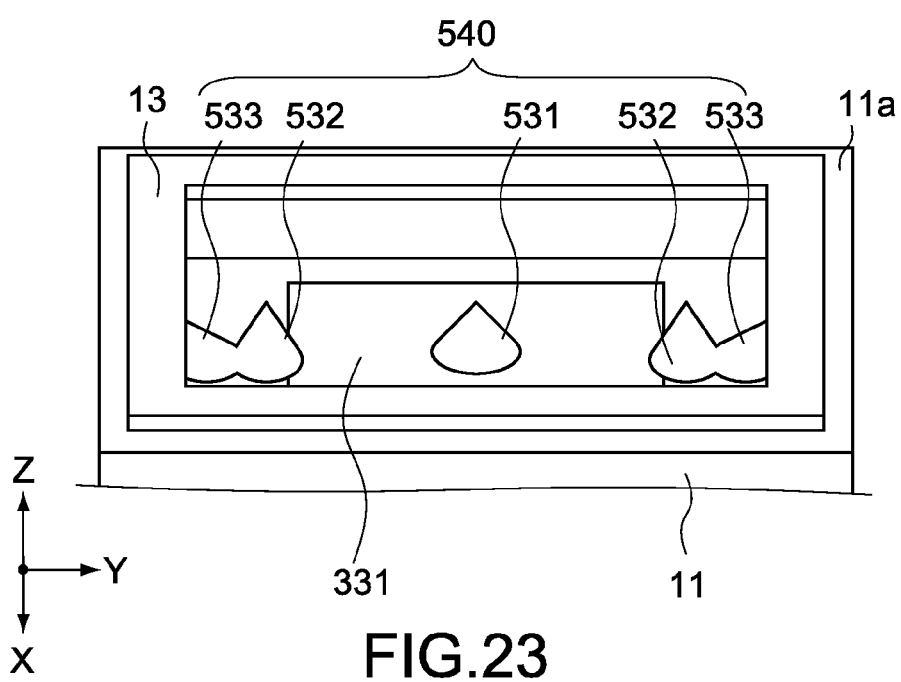
FIG. 23 is a schematic perspective view showing a state of an inside of a container main body in the tenth embodiment.

FIG. 22 is a schematic cross-sectional view showing a configuration of an electrochemical device according to a tenth embodiment of the present disclosure. FIG. 23 is a schematic perspective view showing a state of an inside of a container main body of the electrochemical device. Hereinafter, configurations different from those of the above-mentioned embodiments will be mainly described. The same configurations as those of the above-mentioned embodiments will be denoted by the same reference symbols, and descriptions thereof will be omitted or simplified.

In an electrochemical device 110 according to this embodiment, a first structure 540 further includes, in addition to a first protrusion 531 and a plurality of second protrusions 532 described above, a plurality of connection portions 533. The plurality of connection portions 533 connect the plurality of second protrusions 532 to side surfaces 14b (inner peripheral surface) of a container main body 11, respectively. Thus, the second protrusions 532 can be strongly fixed to the container main body 11.

As in the first and second protrusions 531 and 532, the connection portions 533 are made of a cured conductive adhesive. Alternatively, the connection portions 533 may be made of other materials. The shape and size of the connection portions 533 are not particularly limited. As long as the connection portions 533 can connect the second protrusions 532 to the side surfaces 14b of a recess 14, any shape and size may be employed.

Eleventh Embodiment

Figure 24:
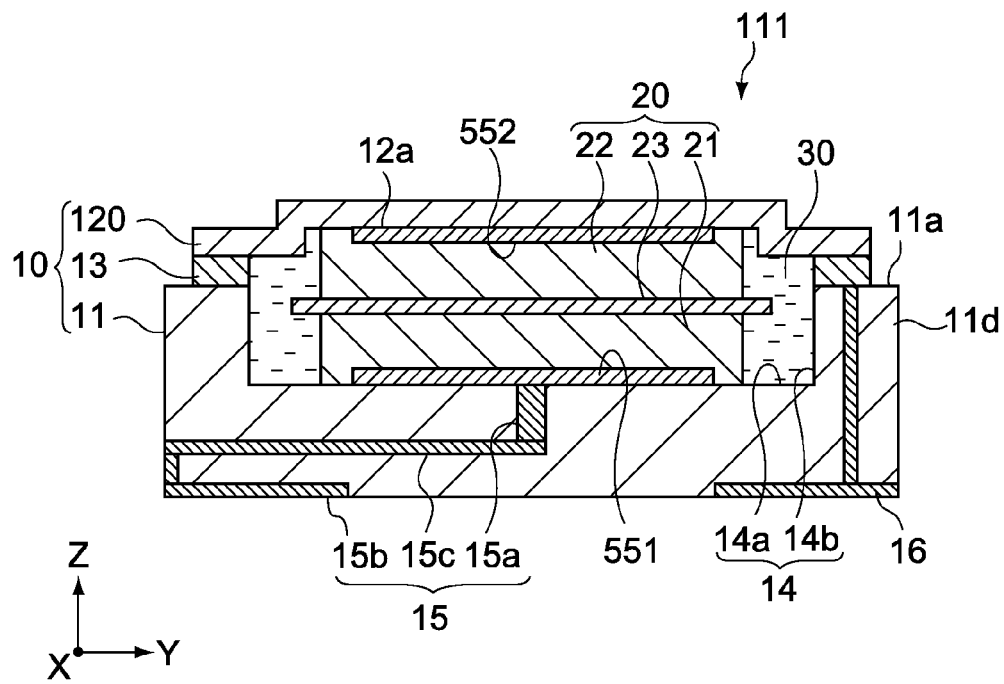
FIG. 24 is a schematic cross-sectional view showing a configuration of an electrochemical device according to an eleventh embodiment of the present disclosure.

FIG. 24 is a schematic cross-sectional view showing a configuration of an electrochemical device according to an eleventh embodiment of the present disclosure. Hereinafter, configurations different from those of the third embodiment will be mainly described. The same configurations as the third embodiment will be denoted by the same reference symbols, and descriptions thereof will be omitted or simplified.

In an electrochemical device 111 according to this embodiment, forms of first and second structures 551 and 552 are different from those of the third embodiment.

A first structure 551 is provided between a bottom surface 14a of a recess 14 and a positive-electrode layer 21. The first structure 551 is bonded on the bottom surface 14a to cover a via-hole 15a embedded in the bottom surface 14a. The first structure 551 is formed with an even thickness on the bottom surface 14a. A plane shape of the first structure 551 is formed in a rectangular shape or a circular shape smaller than the positive-electrode layer 21. The first structure 551 is made of a conductive adhesive and made of a harder material than the positive-electrode layer 21. The first structure 551 is embedded in an inside of the positive-electrode layer 21 to be pushed into the positive-electrode layer 21.

A second structure 552 is provided between an inner surface 12a of a lid 12 and a negative-electrode layer 22. The second structure 552 is bonded to the inner surface 12a of the lid 12. The second structure 552 is formed with an even thickness on the inner surface 12a of the lid 12. A plane shape of the second structure 552 is formed in a rectangular shape or a circular shape smaller than the negative-electrode layer 22. The second structure 552 is made of a conductive adhesive and made of a harder material than the negative-electrode layer 22. The second structure 552 is embedded in an inside of the negative-electrode layer 22 to be pushed into the negative-electrode layer 22.

Also in this embodiment, the same action and effect as those of the above-mentioned third embodiment can be provided. According to this embodiment, the first and second structures 551 and 552 are embedded in insides of the electrode layers 21 and 22 by press-fitting into the positive-electrode layer 21 and the negative-electrode layer 22, respectively. Therefore, the first and second structures 551 and 552 have high adhesion properties. Thus, a further reduction of contact resistance and inner resistance can be achieved.

Hereinabove, the embodiments of the present disclosure have been described. The present disclosure is not limited only to the above-mentioned embodiments. As a matter of course, various changes may be added without departing from the gist of the present disclosure.

For example, in each of the above-mentioned embodiments, the first structure and the second structure are provided to be opposed to each other in the Z-axis direction. Alternatively, the first structure and the second structure may be provided not to be opposed to each other. Thus, for example, the shape, size, thickness, and the like of the thin wall portion can be arbitrarily adjusted.

Figure 25:
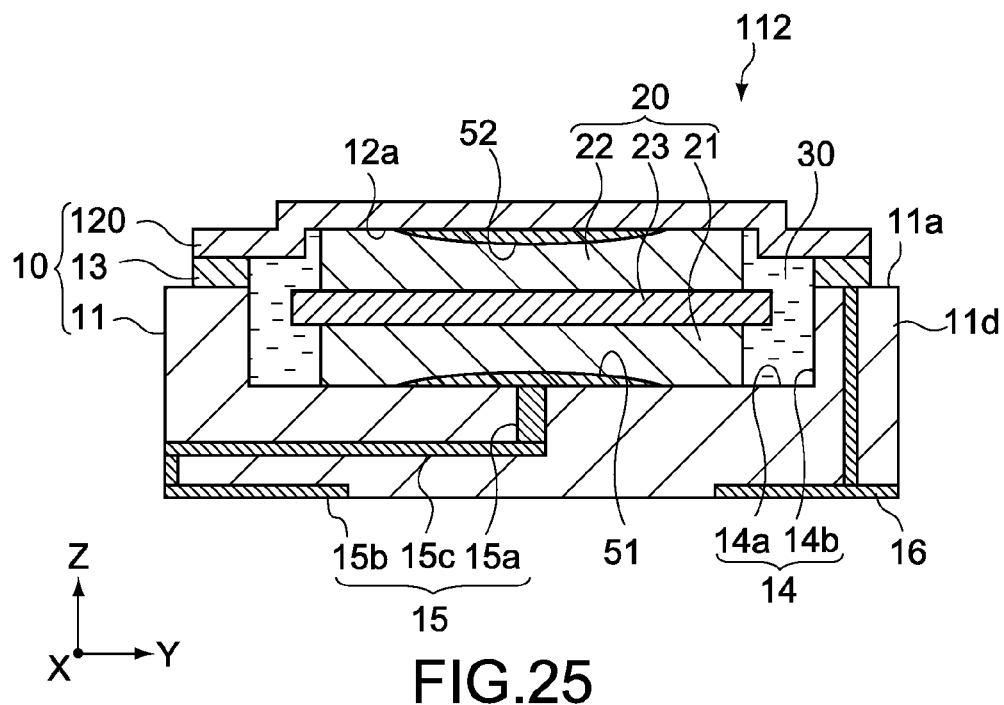
FIG. 25 is a schematic side cross-sectional view showing a modified example of the configuration of the electrochemical device according to the first embodiment.

In the above-mentioned first embodiment, the thin wall portion 23a is formed in the area of the separator 23 that is sandwiched between the positive-electrode layer 21 and the negative-electrode layer 22. However, the present disclosure is not limited thereto. For example, as in an electrochemical device 112 shown in FIG. 25, first and second structures 51 and 52 may be each configured such that the above-mentioned thin wall portion is not formed.

Figure 26:
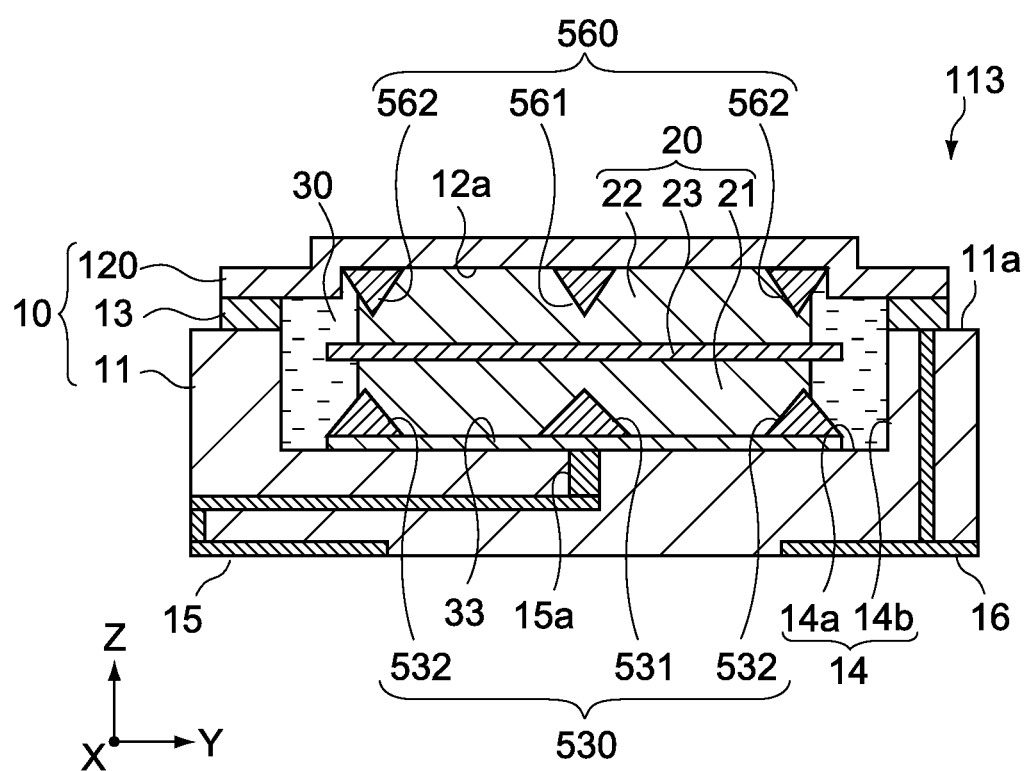
FIG. 26 is a schematic side cross-sectional view showing a modified example of the configuration of the electrochemical device according to the eighth embodiment.

Further, in each of the above-mentioned eight and ninth embodiments, the example in which the first structure is formed of the plurality of protrusions has been described. Alternatively or additionally, the second structure may also be constituted of a plurality of protrusions. For example, an electrochemical device 113 shown in FIG. 26 includes a second structure 560 constituted of a plurality of protrusions 561 and 562. Thus, it is possible to strongly fix a negative-electrode layer 22 to an inner surface 12a of a lid 12 and to increase adhesion between the inner surface 12a of the lid 12 and the negative-electrode layer 22. Note that, in the figure, parts corresponding to FIG. 20 will be denoted by the same reference symbols, and descriptions thereof will be omitted.

Figure 27A:
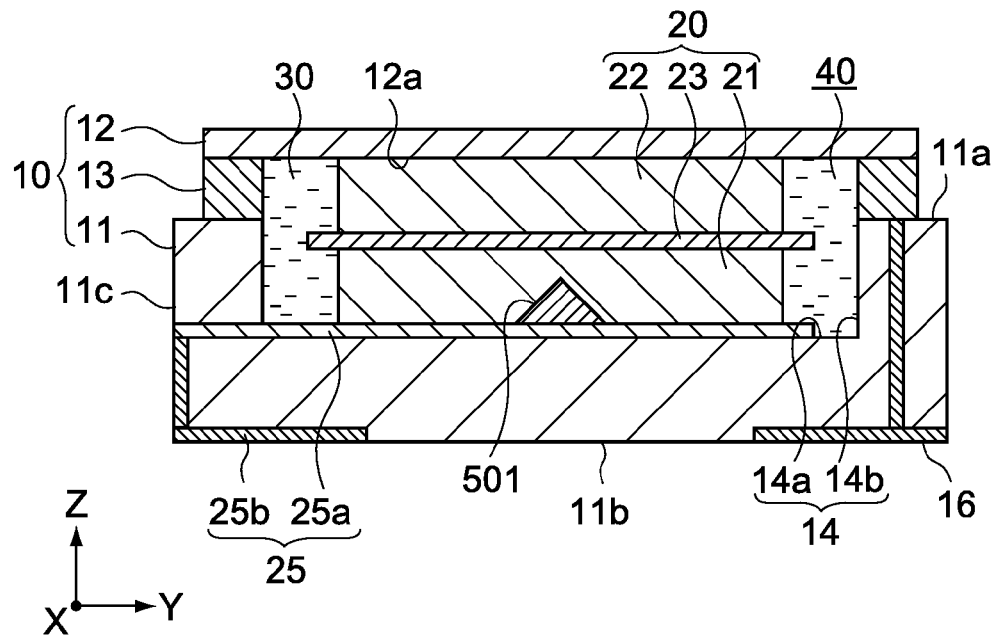
FIGS. 27A and 27B are schematic side cross-sectional views each showing a modified example of the configuration of the electrochemical device according to each of the embodiments of the present disclosure.
Figure 27B:
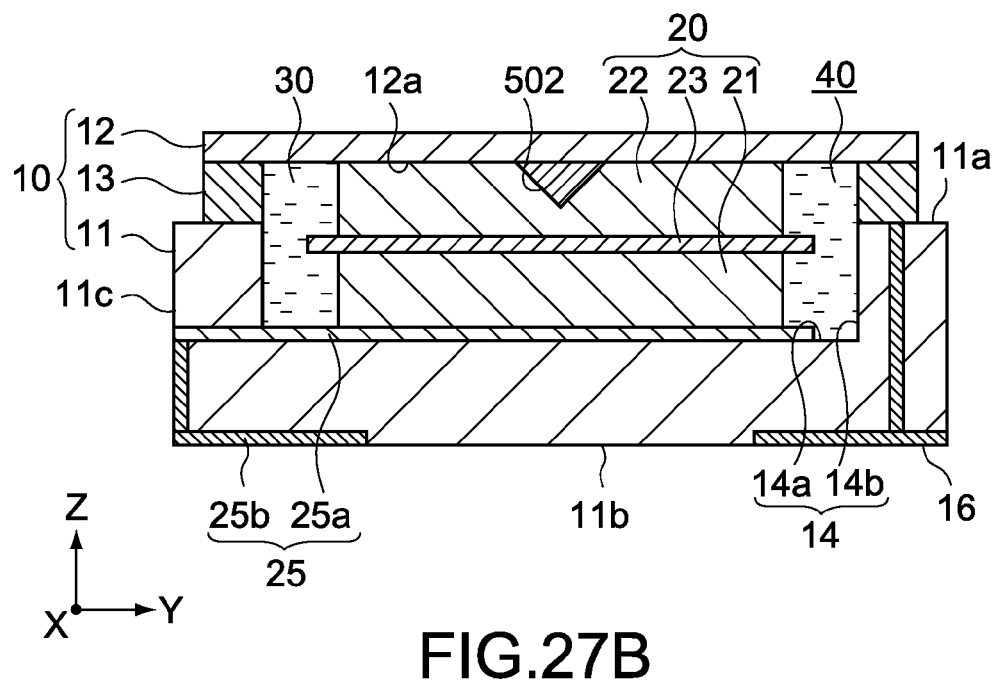

Further, in each of the above-mentioned embodiments, the electrochemical device including the first and second structures as the structure has been described as an example. As shown in FIG. 27A, only a first structure 501 on a side of the container main body 11 may be provided as the structure. Alternatively, as shown in FIG. 27B, only a second structure 502 on a side of a lid 12 may be provided as the structure. Note that, in each figure, the parts corresponding to those of FIG. 6 will be denoted by the same reference symbols and descriptions thereof will be omitted.

In addition, in each of the above-mentioned embodiments, the example in which the positive-electrode layer 21 and the negative-electrode layer 22 constituting the storage element 20 are formed to have the same shape and size has been described. However, the size of the electrode layers does not need to be identical to each other. One electrode layer may be formed to be larger than the other electrode layer.

The present disclosure contains subject matter related to that disclosed in Japanese Priority Patent Application JP 2012-184707 filed in the Japan Patent Office on Aug. 24, 2012, the entire content of which is hereby incorporated by reference.

What is claimed is:

1. An electrochemical device, comprising:
    a container including
        a container main body including a first inner surface, and
        a lid including a second inner surface that is opposed to the first inner surface, the lid being joined to the container main body;
    a storage element including
        a first electrode layer that is bonded to the first inner surface,
        a second electrode layer that is bonded to the second inner surface, and
        a separator that is provided between the first electrode layer and the second electrode layer, the storage element being sandwiched between the first inner surface and the second inner surface;
    a first structure that is provided to an area of a part of the first inner surface in an island shape, at least partially embedded in an inside of the first electrode layer, made of a cured conductive adhesive, and has a cross-section parallel to the first inner surface, the cross-section becoming smaller from the first inner surface to the storage element; and
    a second structure that is provided to an area of a part of the second inner surface in an island shape, at least partially embedded in an inside of the second electrode layer, made of a cured conductive adhesive, and has a cross-section parallel to the second inner surface, the cross-section becoming smaller from the second inner surface to the storage element, the first structure and the second structure being opposed to each other in a thickness direction of the storage element.

2. The electrochemical device according to claim 1, wherein
    the lid includes
        a flat plate portion including the second inner surface,
        a peripheral wall portion that surrounds the flat plate portion, and
        a joining portion that is provided around the peripheral wall portion and joined to the container main body.

3. The electrochemical device according to claim 1, wherein
    the container further includes
        a first terminal that is provided in the first inner surface and electrically connected to the first electrode layer,
        a second terminal that is provided in an outer surface of the container main body, and
        a wiring portion configured to electrically connect the first terminal and the second terminal to each other.

4. The electrochemical device according to claim 3, wherein
    the first terminal is embedded in the first inner surface, and the first structure is configured to cover the first terminal.

5. The electrochemical device according to claim 3, wherein the container further includes a power collection layer that is provided between the first structure and the first terminal and connected to the first electrode layer.

6. The electrochemical device according to claim 3, wherein
the container further includes an auxiliary layer that is provided between the first inner surface and the first electrode layer and includes a through-hole through which the first structure passes.

7. The electrochemical device according to claim 1, wherein
the first structure includes
a first protrusion that is provided in a central portion of the first electrode layer and embedded in the first electrode layer, and
a plurality of second protrusions that are provided in a peripheral portion of the first electrode layer and at least partially embedded in the first electrode layer.

8. The electrochemical device according to claim 7, wherein
the first structure further includes a connection portion configured to connect the plurality of second protrusions to an inner peripheral surface of the container main body.

9. The electrochemical device according to claim 1, wherein
the first structure and the second structure are opposed to each other in a central portion of the storage element.

10. The electrochemical device according to claim 1, wherein
the second structure includes
a first protrusion that is provided in a central portion of the second electrode layer and embedded in the second electrode layer, and
a plurality of second protrusions that are provided in a peripheral portion of the second electrode layer and at least partially embedded in the second electrode layer.

11. The electrochemical device according to claim 1, wherein
the structure has a sharp-pointed shape.

12. The electrochemical device according to claim 1, wherein
the structure forms, in an area of the separator that is sandwiched between the first electrode layer and the second electrode layer, a thin wall portion having a smaller thickness than a thickness of the peripheral portion around the area.

13. The electrochemical device according to claim 1, wherein
the structure has one of a dome shape and a cone shape.

14. The electrochemical device according to claim 1, wherein
the structure compresses and deforms the storage element, such that the structure is at least partially embedded in an inside of at least one of the first electrode layer and the second electrode layer.

\* \* \* \* \*